(12) United States Patent
Komma et al.

(10) Patent No.: US 7,760,612 B2
(45) Date of Patent: Jul. 20, 2010

(54) OPTICAL ELEMENT AND OPTICAL HEAD DEVICE USING IT, AND OPTICAL INFORMATION DEVICE USING THIS OPTICAL HEAD DEVICE, AND COMPUTER, OPTICAL DISK PLAYER, CAR NAVIGATION SYSTEM, OPTICAL DISK RECORDER AND OPTICAL DISK SERVER USING THIS OPTICAL INFORMATION DEVICE

(75) Inventors: Yoshiaki Komma, Hirakata (JP); Sadao Mizuno, Ibaraki (JP); Kousei Sano, Osaka (JP)

(73) Assignee: Panasonic Corporation, Osaka (JP)

( * ) Notice: Subject to any disclaimer, the term of this patent is extended or adjusted under 35 U.S.C. 154(b) by 1462 days.

(21) Appl. No.: 10/504,373

(22) PCT Filed: Jan. 30, 2003

(86) PCT No.: PCT/JP03/00949

§ 371 (c)(1),
(2), (4) Date: Aug. 12, 2004

(87) PCT Pub. No.: WO03/073152

PCT Pub. Date: Sep. 4, 2003

(65) Prior Publication Data

US 2005/0117497 A1 Jun. 2, 2005

(30) Foreign Application Priority Data

Feb. 26, 2002 (JP) ............................ 2002-049113

(51) Int. Cl.
*G11B 7/00* (2006.01)
(52) U.S. Cl. ............................ 369/112.16; 369/112.03; 369/112.29

(58) Field of Classification Search ............ 369/110.01, 369/110.02, 110.04, 112.16, 112.17, 112.03, 369/112.29
See application file for complete search history.

(56) References Cited

U.S. PATENT DOCUMENTS

| 5,600,614 | A  | * | 2/1997 | Katayama | ................. 369/44.23 |
| 5,777,973 | A  | * | 7/1998 | Yoo et al. | ............... 369/112.06 |
| 6,081,488 | A  | * | 6/2000 | Yamanaka | ................. 369/44.23 |
| 6,192,021 | B1 |   | 2/2001 | Saito et al. | |
| 6,201,780 | B1 |   | 3/2001 | Katayama | |
| 6,240,053 | B1 | * | 5/2001 | Akiyama | .................. 369/44.23 |

(Continued)

FOREIGN PATENT DOCUMENTS

| JP | 10-334504 | 12/1998 |
| JP | 11-296890 | 10/1999 |
| JP | 11-339307 | 12/1999 |

OTHER PUBLICATIONS

Electronic Translation of JP 11-339307.*

*Primary Examiner*—Wayne R Young
*Assistant Examiner*—Thomas D Alunkal
(74) *Attorney, Agent, or Firm*—Hamre, Schumann, Mueller & Larson, P.C.

(57) ABSTRACT

Providing an objective lens with a large numerical aperture (NA), the present invention records or plays conventional optical disks such as CDs and DVDs using an optical head capable of recording or reproducing high-density optical disks. An optical element (8) is provided between a first and second laser light source and an objective lens (18) for the purpose of converting a wave front of a second optical beam 32. Furthermore, the optical element (8) and the objective lens (18) are fixed to move as a single piece.

44 Claims, 18 Drawing Sheets

U.S. PATENT DOCUMENTS

| | | | |
|---|---|---|---|
| 6,418,108 B1 * | 7/2002 | Ueda et al. | 369/112.23 |
| 6,442,124 B1 * | 8/2002 | Chung et al. | 369/112.07 |
| 6,563,780 B2 * | 5/2003 | Kim et al. | 369/112.01 |
| 6,650,612 B1 * | 11/2003 | Matsuzaki et al. | 369/112.05 |
| 6,798,731 B1 * | 9/2004 | Kim et al. | 369/124.14 |
| 6,819,646 B1 * | 11/2004 | Kitaoka et al. | 369/112.01 |
| 2001/0008513 A1 | 7/2001 | Arai et al. | |
| 2001/0021146 A1 * | 9/2001 | Kikuchi et al. | 369/44.23 |
| 2001/0050892 A1 | 12/2001 | Takahashi et al. | |
| 2003/0002402 A1 * | 1/2003 | Lee et al. | 369/44.27 |
| 2003/0075669 A1 * | 4/2003 | Tadaki | 250/201.5 |
| 2003/0095334 A1 * | 5/2003 | Kim et al. | 359/637 |
| 2003/0107979 A1 * | 6/2003 | Kim et al. | 369/112.07 |
| 2003/0185134 A1 * | 10/2003 | Kimura et al. | 369/112.08 |

* cited by examiner

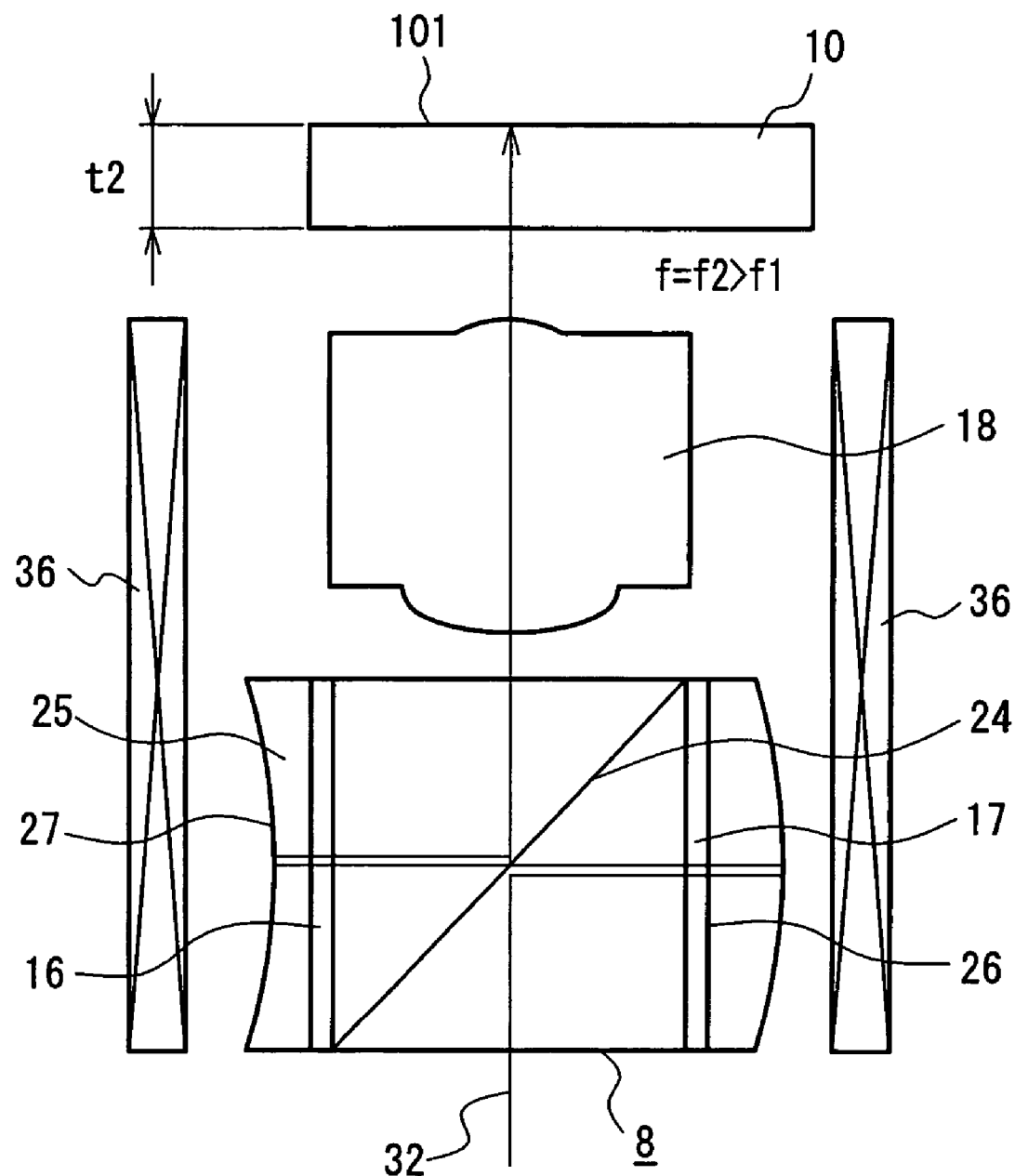
F I G. 3

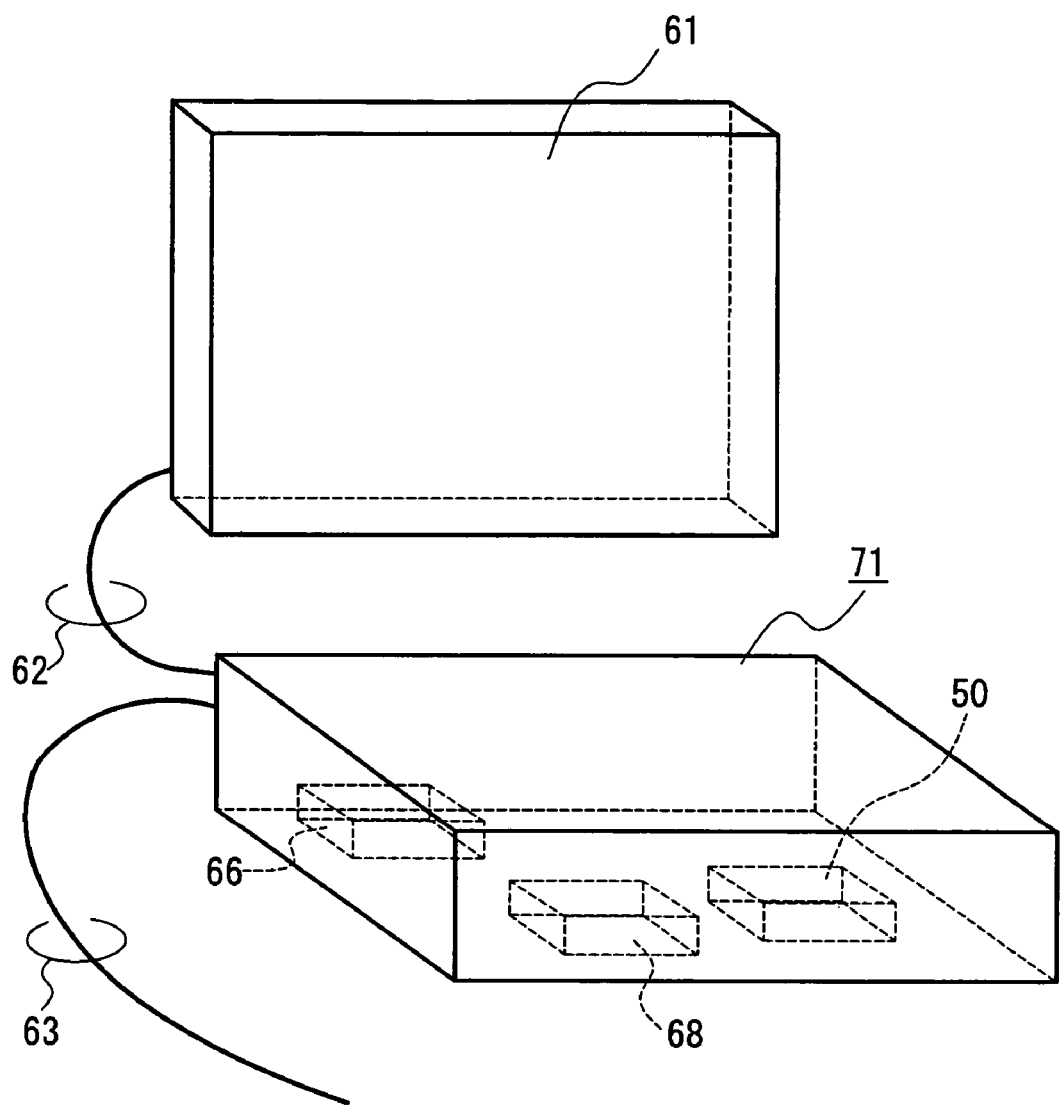
F I G. 15

OPTICAL ELEMENT AND OPTICAL HEAD DEVICE USING IT, AND OPTICAL INFORMATION DEVICE USING THIS OPTICAL HEAD DEVICE, AND COMPUTER, OPTICAL DISK PLAYER, CAR NAVIGATION SYSTEM, OPTICAL DISK RECORDER AND OPTICAL DISK SERVER USING THIS OPTICAL INFORMATION DEVICE

TECHNICAL FIELD

The present invention relates to optical head devices, and optical elements that are used in such optical head devices for the purpose of recording information onto optical information media such as, for example, optical disks or optical cards and for reproducing or erasing information recorded onto the optical information media, to optical information apparatuses in which these optical head devices are used, and to various systems in which these optical information apparatuses are applied.

BACKGROUND ART

Optical memory technology that uses optical disks that have pit-shaped patterns as high-density, large-volume memory media is gradually being applied widely to and entering general use in digital audio disks, video disks, document file disks and also data files. Thus, the functions for using a minutely narrowed light beam to successfully achieve recording onto and reproduction of information from an optical disk with high reliability, are divided into three main divisions, that is, a focusing function which forms a minute spot at the diffraction limit on the optical disk, focus control ("focus servo") and tracking control of the optical system, and pit signal ("information signal") detection.

With recent advances in optical system design technology and the shortening of the wavelengths of the semiconductor lasers serving as light sources, the development of optical disks containing volumes of memory at greater than conventional densities is progressing. As an approach towards higher densities, problems such as an increase in the aberration due to slanting of the light axis (what is known as "tilt") were found when investigating an increase in the optical disk side numerical aperture (NA) of the focusing optical system that focuses light beams onto the optical disk. That is to say, the amount of aberration that occurs with respect to the tilt increases when the NA is increased. It is possible to prevent this by thinning down the thickness (substrate thickness) of the transparent substrate of the optical disk.

The substrate thickness of a Compact Disc (CD), which can be considered a first generation optical disk, is approximately 1.2 mm, and the optical head device for CDs uses a light source emitting infrared light (with a wavelength $\lambda 3$ that is 780 nm to 820 nm) and an objective lens with a NA of 0.45. Furthermore, the substrate thickness of a Digital Versatile Disc (DVD), which can be considered a second generation optical disk, is approximately 0.6 mm, and the optical head device for DVDs uses a light source emitting red light (with a wavelength $\lambda 2$ that is 630 nm to 680 nm), and an objective lens with a NA of 0.6. Moreover, the substrate thickness of a third generation optical disk is approximately 0.1 mm, and the optical head device for these disks uses a light source emitting blue light (with a wavelength $\lambda 1$ that is 390 nm to 415 nm), and an objective lens with a NA of 0.85.

It should be noted that in this specification, "substrate thickness" refers to the thickness from a surface of the optical disk (or the optical recording medium) on which the light beam is incident to the information recording surface. As described above, the substrate thickness of the transparent substrate of the high-density optical disks is set to be thin. From the view point of economy and the space that is occupied by the device, it is preferable that an optical information apparatus can record and reproduce information from a plurality of optical disks having differing substrate thicknesses and recording densities. However for this, it is necessary to have an optical head device provided with a focusing optical system capable of focusing a light beam up to the diffraction limit onto a plurality of optical disks having differing substrate thicknesses.

Furthermore, if recording on or reproducing from an optical disk whose substrate thickness of the transparent substrate is thick, then it is necessary to focus the light beam onto the information recording surface that is further back than the disk surface, and thus the focal length must be increased.

A configuration is disclosed in JP H11-339307A (first conventional example) whose object is defined so as to provide an optical head device that records and reproduces information from a plurality of optical disks with differing substrate thicknesses. The first conventional example is described below with reference to FIG. 17 and FIG. 18.

As shown in FIG. 17, the optical head device according to the first conventional example, is provided with a mirror 31 that has a plurality of reflective surfaces with differing radii of curvature and whose reflective surfaces are constituted by a dielectric multi-layer film, and an objective lens 1805 that is designed with an aperture diameter that reproduces high density optical disks with a light beam from the shortest wavelength of the light beams 401 to 403 that are emitted from light sources of different wavelengths. Here, the wavelengths of the light beams 401 to 403 become shorter in this order, and the wavelength of the light source that is used is determined by the optical disk type. The light beam 403, which has the shortest wavelength of the light beams 401 to 403, is used if a high density optical disk 10a is reproduced, the second shortest wavelength light beam 402 is used if reproducing a medium density optical disk 10b, and the longest wavelength light beam 401 is used if reproducing a low density optical disk 10c. The light beams 401 to 403 are reflected toward the optical disk by the mirror 31, which has a plurality of reflecting surfaces with different radii of curvature, and are incident on the objective lens 1805.

As shown in FIG. 18, the mirror 31 contains a plurality of reflective surfaces with different radii of curvature for the purpose of reflecting the plurality of light beams 401 to 403 toward the respective optical disks. A first reflecting surface 311 is constituted by a dielectric multilayer film that totally reflects and converts the light beam 403 to a light bundle having an optimum spreading angle with respect to the objective lens 1805, as well as totally passing light beams emitted from the other light sources. Furthermore, a second reflecting surface 312 (a spherical surface with a radius of curvature R2) is constituted by a dielectric multilayer film that totally reflects and converts the light beam 403 to a light bundle having an optimum spreading angle with respect to the objective lens 1805, as well as totally passing light beams that are emitted from the other light sources. Furthermore, a third reflecting surface 313 (a spherical surface with a radius of curvature R3) is constituted by a dielectric multilayer film that totally reflects and converts the light beam 401 to a light bundle having an optimum spreading angle with respect to the objective lens 1805, as well as totally passing light beams emitted from the other light sources. By selecting the reflective surfaces in accordance with the wavelength of the light sources and the types of optical disks in this way, it is possible to convert the wave front of the light beams 401 to 403 to allow interchangeable reproduction of the plurality of different types of optical disks 10a to 10c.

Furthermore, a configuration whose object is to allow interchangeable reproduction of a plurality of different types of optical disks, using a plurality of light beams having different wavelengths is also disclosed in for example JP H10-334504A (second conventional example) and in JP H11-296890A (third conventional example). That is to say, a configuration which uses a diffraction optical element (DOE) or a phase converting element combined with an objective lens is disclosed in the second conventional example. Furthermore, a configuration in which a plurality of objective lenses is mechanically interchanged is disclosed in the third conventional example.

As shown in FIG. 17, in the first conventional example, the objective lens 1805 is driven independently of the mirror 31 (see FIG. 4 to FIG. 6 of JP 11-339307A). However, in the first conventional example, because the light beam is converted, as described above, by the curved mirror 31 from parallel light to a light bundle that has an optimum spreading angle, a relative position of the objective lens changes with regard to the incident light wave front, aberrations occur, and focusing characteristics are degraded when the objective lens moves due to tracking during recording or reproduction of the optical disk. Furthermore, the reflecting surface of the mirror 31 is a curved surface, that is to say, it is made from a spherical surface. However a spherical surface is insufficient to compensate for differences in the substrate thicknesses between the optical disks 10a to 10c and differences in wavelength between the light beams, and it is not possible to diminish fifth order or higher order aberrations.

Furthermore, in the second conventional example, diffraction optical elements and phase converting elements are used such as described above. However, it is necessary to increase the focal length if recording or reproducing optical disks whose transparent substrate thickness is thick, and for this purpose, it is necessary that the optical element that converts the light beam contains a certain lens power. However, the lattice pitch becomes finer toward the outer peripheral portion when lens power is applied to the diffraction optical element and the lattice pitch is equivalent to the wavelength for example if the numerical aperture is in the order of 0.6, and as a result the diffraction effect decreases and there is a drop in light utilization. Furthermore, the structure becomes minute when a lens power is applied to a phase converting element, and the same problem occurs as with a diffraction optical element.

Furthermore, in the third conventional example as described above, a configuration in which the objective lenses are interchanged is employed, and together with an increase in the number of parts, miniaturization of the optical head device is also problematic because a plurality of objective lenses are required. Furthermore, miniaturization of the optical head device is also problematic due to the requirement of a mechanism to interchange the objective lenses.

DISCLOSURE OF THE INVENTION

It is an object of the present invention to solve the problems of the conventional art, and to provide an optical head device and the optical element used in it capable of realizing interchangeable recording and interchangeable reproduction of a plurality of optical information media having different substrate thickness, to provide optical information apparatuses using the optical head device, and to provide various systems applying the optical information apparatuses.

To achieve the object described above, a configuration of the optical element according to the present invention provides a dichroic polarization separation film for passing a first light beam of wavelength $\lambda 1$, reflecting linearly polarized light of a second light beam of wavelength $\lambda 2$ that is polarized in a first polarizing direction, and passing linearly polarized light of the second light beam that is polarized in a direction perpendicular to the first polarizing direction; a first ¼ wavelength plate for converting the linearly polarized light of the second light beam that is polarized in the first polarizing direction and reflected by the dichroic polarization separation film, into substantially circularly polarized light; a first reflecting surface for reflecting the second light beam that is converted to circularly polarized light by the first ¼ wavelength plate; a second ¼ wavelength plate for converting again the second light beam that is reflected at the first reflecting surface converted to linearly polarized light with a polarizing direction perpendicular to the first polarizing direction by the first ¼ wavelength plate and passed by the dichroic polarization separation film, into substantially circularly polarized light; and a second reflecting surface for reflecting the second light beam that is converted to substantially circularly polarized light by the second ¼ wavelength plate, wherein the optical element reflects by the dichroic polarization separation film the second light beam that is reflected by the second reflecting surface and converted to linearly polarized light polarized in the first polarizing direction by the second ¼ wavelength plate and wherein the optical element converts the wave front of the second light beam.

In the configuration of the optical element of the present invention, it is preferable that the first or the second reflecting surfaces are curved surfaces, and the wave front of the second light beam is converted by the curved surface. Furthermore, in this case, it is preferable that the curved surface that converts the wave front of the second light beam is a convex surface.

Furthermore, in the configuration of the optical element of the present invention, it is preferable that the first or second reflecting surface is a reflective diffraction optical element, and the wave front of the second light beam is converted by the diffracting optical element.

Furthermore, in the configuration of the optical element of the present invention, it is preferable that the dichroic polarization separation film also reflects linearly polarized light of a third light beam of wavelength $\lambda 3$ that is polarized in the first polarizing direction, and passes the linearly polarized light of the third light beam that is polarized in a direction perpendicular to the first polarizing direction, wherein the first ¼ wavelength plate converts the linearly polarized light of the third light beam that is polarized in the first polarizing direction and reflected by the dichroic polarization separation film into substantially circularly polarized light, wherein the second ¼ wavelength plate converts again the third light beam reflected at the first reflecting surface that is converted to linearly polarized light with a polarizing direction perpendicular to the first polarizing direction by the first ¼ wavelength plate and passed by the dichroic polarization separation film, into substantially circularly polarized light and wherein the optical element reflects by the dichroic polarization separation film the third light beam that is reflected by the second reflecting surface and that is converted to linearly polarized light polarized in the first polarizing direction by the second ¼ wavelength plate, and wherein the optical element converts the wave front of the third light beam. Furthermore, in this case, it is preferable that the reflecting surface of the first or second reflecting surface that is different from the reflecting surface that converts the wave front of the second light beam is a curved surface, and the wave front of the third light beam is converted by that curved surface. In this case, it is further preferable that the curved surface that converts the wave front of the third light beam is a concave surface. In this case it also further preferable that it is further provided with dichroic film for passing the third light beam and reflecting the second light beam, which is provided between the reflecting surface of the first or second reflecting surface that is different from the reflecting surface that converts the wave front of the second light beam, and the dichroic polarization separation film. Furthermore, in this case it is also preferable that the reflecting surface of the first or second reflecting surface that is different from the reflecting surface that converts the wave front of the second light beam is a reflective diffraction optical element, and the wave front of the third light beam is converted by the diffraction optical element.

Furthermore, a first configuration of an optical head device according to the present invention provides a first laser light source for emitting a first light beam of wavelength $\lambda 1$, a second laser light source for emitting a second light beam of wavelength $\lambda 2$, and an objective lens for focusing the first and second light beams emitted from the first and second laser light sources respectively onto first and second optical information media, wherein the optical element according to any one of claims 1 to 4 is provided between the first and second laser light sources and the objective lens.

Furthermore, it is preferable that the first configuration of the optical head device according to the present invention satisfies the following Expressions 3:

$\lambda 1 < \lambda 2$ $t1 < t2$ $f1 < f2$ \hfill Expressions 3 where t1 is the substrate thickness of the first optical information recording medium, t2 is the substrate thickness of the second optical information recording medium, f1 is the focal length when focusing the first light beam onto the information recording surface of the first optical information recording medium and f2 is the focal length when focusing the second light beam onto the information recording surface of the second optical information recording medium.

Furthermore, in the first configuration of the optical head of the present invention, it is preferable that the first light beam of wavelength $\lambda 1$ passes through the transparent substrate of substrate thickness t1 and is focused on the information recording surface of the first optical information recording medium by the objective lens, and wherein the first optical information medium records information at a higher density than the second optical information medium, wherein a second region is provided on the surface of the objective lens near the optical information medium at a circumferential portion of a first region through which the first light beam passes, and wherein the second light beam passes through the transparent substrate of substrate thickness t2 ($>$t1) and is focused on the information recording surface of the second optical information medium when the second light beam of wavelength $\lambda 2$ ($>\lambda 1$) passes through the second region. Furthermore, in this case, it is also preferable that the second region has a convex surface shape.

Furthermore, a second configuration of the optical head device according to the present invention provides a first laser light source for emitting a first light beam of wavelength $\lambda 1$, a second laser light source for emitting a second light beam of wavelength $\lambda 2$, a third laser light source for emitting a third light beam of wavelength $\lambda 3$, and an objective lens for focusing the first to third light beams emitted from the first to third laser light sources respectively onto first to third optical information media, wherein the optical element according to any one of claims 5 to 9 is provided between the first to third laser light sources and the objective lens.

Furthermore, in the second configuration of the optical head device of the present invention, it is preferable that the optical element and the objective lens are fixed to move as a single piece.

Furthermore it is preferable that the second configuration of the optical head device according to the present invention satisfies the following Expression 2:

$\lambda 1 < \lambda 2 < \lambda 3$ $t1 < t2 < t3$ $f1 < f2 < t3$ \hfill Expression 2 where t1 is the substrate thickness of the first optical information recording medium, t2 is the substrate thickness of the second optical information recording medium, t3 is the substrate thickness of the third optical information recording medium, f1 is the focal length when focusing the first light beam onto the information recording surface of the first optical information recording medium, f2 is the focal length when focusing the second light beam onto the information recording surface of the second optical information recording medium and f3 is the focal length when focusing the third light beam onto the information recording surface of the third optical information recording medium.

Furthermore, in the second configuration of the optical head of the present invention, it is preferable that the first light beam of wavelength $\lambda 1$ passes through the transparent substrate of substrate thickness t1 and is focused on the information recording surface of the first optical information recording medium by the objective lens, and wherein the first optical information medium records information at a higher density than the third optical information medium, wherein a second region is provided on the surface of the objective lens near the optical information medium at a circumferential portion of a first region through which the first light beam passes, and wherein the third light beam passes through the transparent substrate of substrate thickness t3 ($>$t1) and is focused on the information recording surface of the third optical information medium when the third light beam of wavelength $\lambda 3$ ($>\lambda 1$) passes through the second region. Furthermore, in this case it is preferable that the second region has a convex surface shape.

Furthermore, it is preferable that the first or second configuration of the optical head device according to the present invention further provides a first convex lens for receiving a light beam emitted from a laser light source, and converting the light beam into gently diverging light, and a second convex lens that converts the light beam that is converted to gently diverging light by the first convex lens to substantially parallel light.

Furthermore, a configuration of an optical information apparatus according to the present invention provides the optical head device according to the present invention, an optical information medium drive portion for driving the optical information medium, and a control portion for receiving a signal obtained from the optical head device, and based on the signal, for controlling the optical information medium drive portion and the laser light source and objective lens within the optical head device.

Further, a configuration of a computer according to the present invention provides the optical information apparatus according to the present invention, an input device for inputting information, a processing unit for processing based on information input from the input device and/or information read out by the optical information apparatus, and an output device for display or output of the information input by the input device, information read out by the optical information apparatus, or a result processed by the processing unit.

Further, a configuration of an optical disk player according to the present invention includes the optical information apparatus according to the present invention, and an information-to-image conversion apparatus for converting the information signal obtained from the optical information apparatus to an image.

Furthermore, a configuration of a car navigation system according to the present invention includes the optical disk player according to the present invention.

Furthermore, a configuration of an optical disk recorder according to the present invention includes the optical information apparatus according to the present invention, and an image-to-information conversion apparatus for converting image information to information for recording onto the optical information medium by the optical information apparatus.

Furthermore a configuration of an optical disk server according to the present invention includes the optical information apparatus according to the present invention, and a wireless input/output terminal for exchanging information between the optical information apparatus and an external portion.

BRIEF DESCRIPTION OF THE DRAWINGS

FIG. 3 is a cross-sectional view that schematically shows optical paths of a second light beam in the optical element according to the first embodiment of the present invention;

FIG. 15 is a perspective overview showing an optical disk recorder according to a sixth embodiment of the present invention;

BEST MODE FOR CARRYING OUT THE INVENTION

The present invention is described below further, and in greater detail using the embodiments.

First Embodiment

Figure 1:
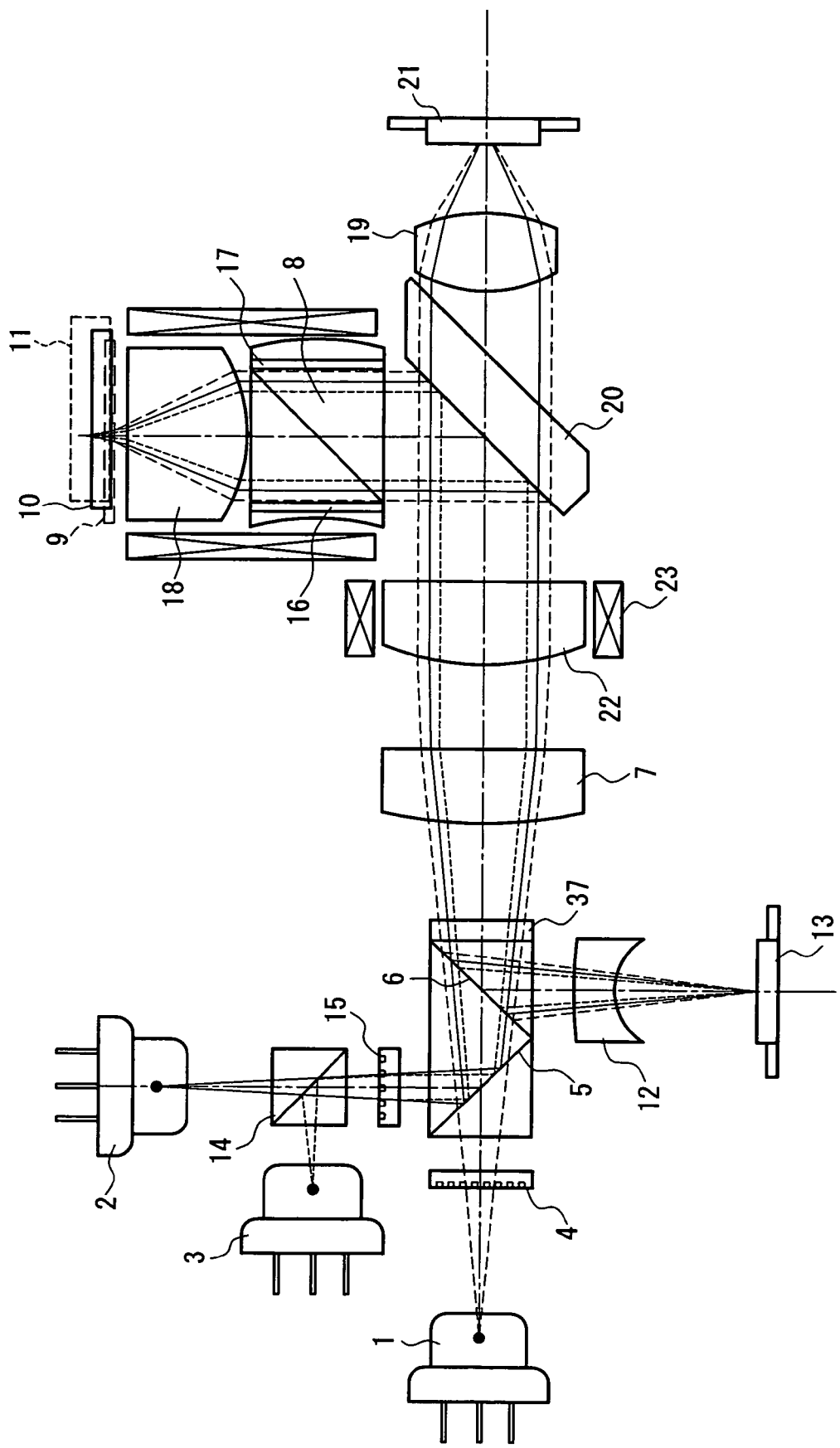
FIG. 1 is an overview showing an optical head device according to a first embodiment of the present invention.

FIG. 1 is a structural overview that shows an optical head device according to the first embodiment of the present invention. In FIG. 1, numeral 1 indicates a first laser light source that emits a first light beam of a wavelength $\lambda 1$, numeral 2 indicates a second laser light source that emits a second light beam of a wavelength $\lambda 2$ and numeral 3 indicates a third laser light source that emits a third light beam of a wavelength $\lambda 3$. Numeral 7 refers to a collimate lens (a first convex lens), numeral 20 refers to a mirror for bending a light axis, and numeral 18 refers to an objective lens that focuses the first to third light beams emitted from the first to third laser light sources 1 to 3 onto an optical information medium. Numeral 8 indicates an optical element that is provided with a wave front conversion element for guiding the second light beam of the wavelength $\lambda 2$, and the third light beam of the wavelength $\lambda 3$, that are emitted from the second and third laser light sources 2 and 3 respectively, along an optical path that is different (optical path detour) from that of the first light beam of the wavelength $\lambda 1$ that is emitted from the first laser light source 1, as well as for converting the wave front of the second and third light beams. That is to say, the optical element 8 is an element that reroutes the optical path and converts the wave fronts of the second and third light beams. Numerals 9, 10 and 11 indicate optical information media such as optical disks or optical cards, however in the explanations given below, the example of an optical disk as the optical information medium will be used.

It is preferable that some or all of the first to third laser light sources 1 to 3 are semiconductor laser light sources, thereby achieving a more compact, lighter and more energy efficient optical head device, and optical information apparatus that uses such devices. Here, the wavelength of the first laser light source 1 is the shortest and the wavelength of the third laser light source 3 is the longest, and the first laser light source 1 is used when recording or reproducing the highest recording density optical disk 9, whereas the third laser light source 3 is used when recording or reproducing the lowest recording density optical disk 11. In this case, by setting the first to third laser light sources 1 to 3 to the wavelengths $\lambda 1$=390 nm to 415 nm, $\lambda 2$=630 nm to 680 nm and $\lambda 3$=780 nm to 810 nm, commercially available CDs and DVDs, and optical disks which have even higher recording densities than CDs and DVDs, can be recorded and reproduced interchangeably.

Figure 2:
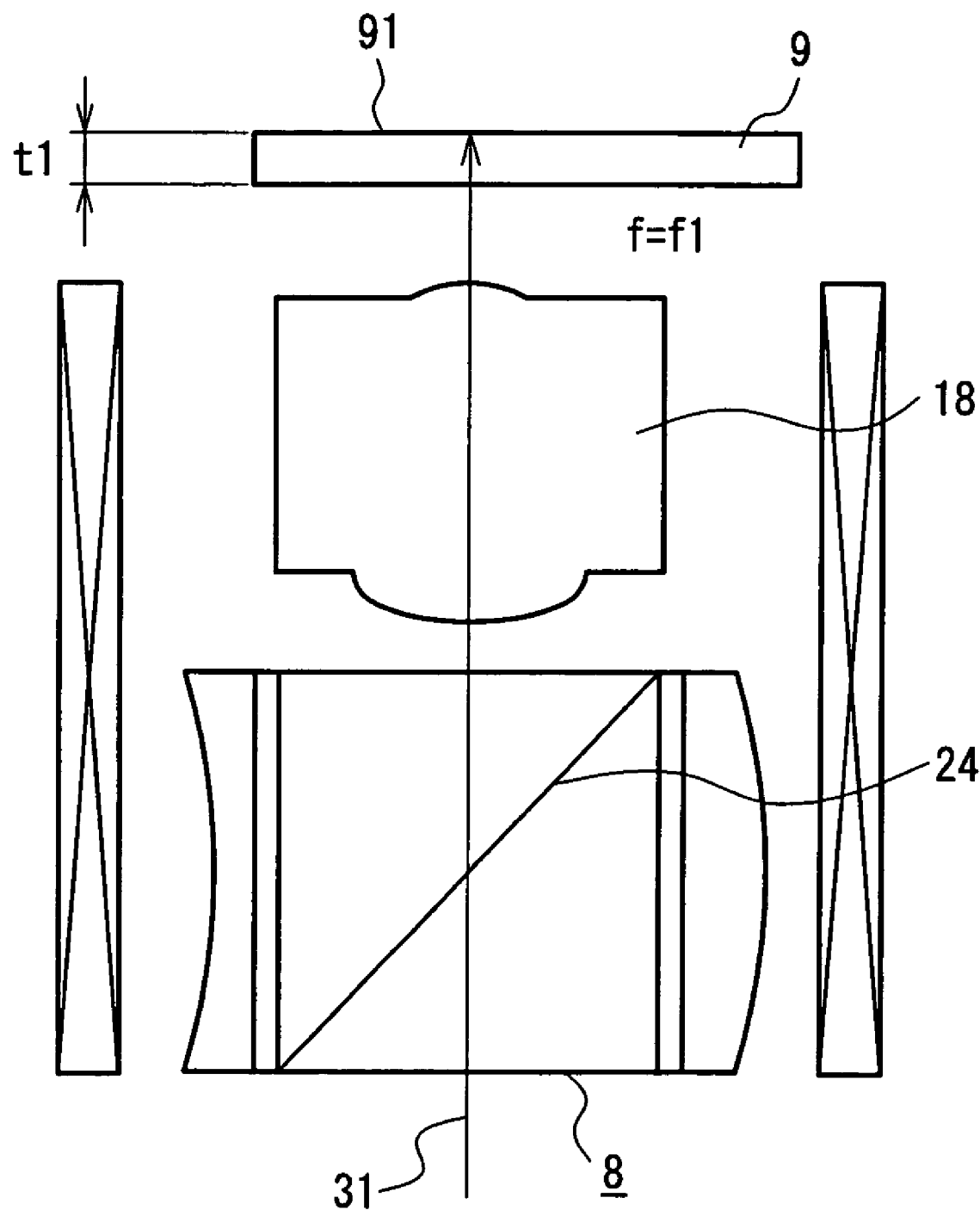
FIG. 2 is a cross-sectional view that schematically shows optical paths of a first light beam in an optical element according to the first embodiment of the present invention.

The highest recording density optical disk 9 is recorded and reproduced by focusing the first light beam that is emitted from the first laser light source 1 onto an information recording surface 91 (see FIG. 2) of the optical disk 9 as given below. That is to say, the first light beam of the wavelength $\lambda 1$ that is emitted from the first laser light source 1 passes through a wavelength selecting film 5 (a dichroic film), passes substantially completely through a beam splitting film 6, and then is converted into circularly polarized light by a ¼ wavelength plate 37. The first light beam, which is converted into circularly polarized light by the ¼ wavelength plate 37, is converted to substantially parallel light by the collimate lens 7, the light axis is bent by a mirror 20 and passes though the optical element 8 as shown in FIG. 2. And, as shown in FIG. 1 and FIG. 2, the first light beam 31 that passed through the optical element 8 passes through a transparent substrate of the disk 9, which has a substrate thickness t1=approximately 0.1 mm, and is focused on the information recording surface 91 by the objective lens 18.

In FIG. 2, numeral 8 indicates the optical element that performs the optical path detour and wave front conversion of the second and third light beams. Furthermore, numeral 24 indicates an optical film that passes the first light beam of the wavelength $\lambda 1$, and that acts, as is explained later, as a dichroic polarization separation film for the second light beam of the wavelength $\lambda 2$, and for the third light beam of the wavelength $\lambda 3$. Here, the optical film 24 allows passage of the first light beam of the wavelength $\lambda 1$, and therefore does not convert the wave front of the first light beam. Because of this, the objective lens 18 is designed such that the substantially parallel first light beam 31 of the wavelength $\lambda 1$ passes through the transparent substrate of substrate thickness t1 of the optical disk 9 and is focused on the information recording surface 91. Furthermore, the optical element 8 does not convert the wave front of the first light beam, so it is not necessary to set the relative positions of the optical element 8 and the objective lens 18 to a high degree of accuracy. Thus, with respect to the first light beam of the wavelength $\lambda 1$ that carries out recording and reproduction of the optical disk 9 whose wavelength is the shortest and whose recording density is the highest, the allowable positional tolerance between the optical element 8 and the objective lens 18 can be enlarged, and furthermore, as is explained below, what should be taken into consideration is the relative position between the optical element 8 and the objective lens 18 when using a light beam with a longer wavelength to record and reproduce a lower recording density optical disk. Consequently, it becomes possible to achieve an optical head device that is easily manufactured because the amount of tolerance in the relative positions of the optical element 8 and the objective lens 18 can be increased.

As shown in FIG. 1, the first light beam is reflected by the information recording surface of the optical disk 9 and traces its way back along the original optical path (return path), is converted by the ¼ wavelength plate 37 into linearly polarized light which has a direction perpendicular to its initial polarizing direction and is then reflected substantially completely by the beam splitter film 6, passing through a detecting lens 12 to be incident on a photodetector 13. Thus, by calculating the output strength from the photodetector 13, a servo signal used in focus control and tracking control, and an information signal, can be obtained. As described above, with regard to the first light beam of the wavelength $\lambda 1$, the beam splitter film 6 is a polarizing segregating film that allows linearly polarized light that is polarized in a predetermined direction to pass completely, and that completely reflects all light that is linearly polarized in a direction perpendicular to it. Furthermore, with regard to the second light beam of the wavelength $\lambda 2$ and the third light beam of the wavelength $\lambda 3$, the beam splitter film 6 has the ability to transmit a part of a linearly polarized light that is emitted from the second and third laser light sources 2 and 3, and to reflect a part of it. With respect the first light beam of the wavelength $\lambda 1$ as described above, numeral 37 is a ¼ wavelength plate, however with respect to the second light beam of the wavelength $\lambda 2$, and the third light beam of the wavelength $\lambda 3$, it is of a constitution that it is either a ½ wavelength plate, or that does not impart a phase difference with respect to the polarizing direction.

It should be noted that by also disposing a diffraction grating 4 in the optical path from the first laser light source 1 to the beam splitter film 6, it is possible to detect a tracking error signal by the method that is known in the art as the differential push pull (DPP) method.

Furthermore, instead of converting the first light beam to substantially parallel light with the collimate lens 7, it is also possible to provide a configuration in which the first light beam is converted to gently diverging light by a first convex lens 7 and the first light beam (the gently diverging light) is further converted to substantially parallel light by a second convex lens 22. Thus, in this case, by moving the second convex lens 22 in the direction of the light axis (horizontally, in FIG. 1) with a driving apparatus 23, the degree of parallelism of the first light beam can be changed. Incidentally, spherical aberrations occur when there is unevenness in the substrate thickness caused by discrepancies in the thickness of the transparent substrate, or when differences in substrate thickness are caused by interlayer thicknesses if the optical disk 9 is a double layer disk. However it is possible to compensate for the spherical aberrations by moving the second convex lens 22 in the direction of the light axis as described above. By moving the second convex lens 22 in a manner such as is given above, about several hundreds of m$\lambda$ of compensation for spherical aberrations are possible if the numerical aperture (NA) of the focusing light is 0.85 with regard to the optical disk 9, thereby compensating for a substrate thickness difference of ±30 μm. However, it is necessary to correct for differences in substrate thickness that are at least 0.5 mm if reproducing DVDs or CDs, so that it is not possible to correct the spherical aberrations adequately by movement of the second convex lens 22 alone.

Furthermore, if the light axis bending mirror 20 is constituted such that it is not a totally reflecting mirror, but is a semi-transparent film that passes at most 20% of the amount of light of the first light beam, such that it guides the part of the first light beam that passed the mirror 20 to the photodetector 21 by a focusing lens (convex lens) 19, then it is possible to monitor changes in the amount of light emitted by the first laser light source 1 by using the signal obtained from the photodetector 21 to feed back changes in the amount of light emitted, and to keep the amount of light emitted by the first laser light source 1 constant.

It should be noted that in the description given above, the term "focus" is used, and in the present invention "focus" means "the convergence of a light beam onto a minute spot at the diffraction limit".

Recording and reproduction of the second highest recording density optical disk 10 is performed by focusing the second light beam that is emitted from the second laser light source 2 onto an information recording surface 101 (see FIG. 3) of the optical disk 10, as described below. That is to say, as shown in FIG. 1, the substantially linearly polarized second light beam of the wavelength $\lambda 2$ that is emitted from the second laser light source 2 after passing through a wavelength selecting film (dichroic film) 14 is then reflected by the wavelength selecting film (dichroic film) 5 and further passes through the beam splitter film 6. The second light beam that has passed through the beam splitter film 6 is converted to substantially parallel light by the collimate lens 7, and its light axis is then bent by the mirror 20 to pass through the optical element 8 as shown in FIG. 3. That is to say, as shown in FIG. 1 and FIG. 3, the second light beam 32 whose light axis is bent by the mirror 20, is reflected four times within the optical element 8, and is wave front converted by a wave front converting element 25 (an optical element that has a convexly curved reflecting surface, such as a reflecting surface 27). The second light beam 32, which has passed through the optical element 8, passes through the transparent substrate of the optical disk 10, which has a substrate thickness t2=approximately 0.6 mm and is focused onto the information recording surface 101 by the objective lens 18.

The action of the optical element 8 will be explained here in detail, with reference to FIG. 3. In FIG. 3, numeral 8 indicates the optical element that performs the optical path detouring and the wave front conversion of the second and third light beams. Furthermore, numeral 24 indicates an optical film that allows the first light beam of the wavelength $\lambda 1$ to be transmitted, and that acts as a dichroic polarization separation film with respect to the second light beam of the wavelength $\lambda 2$ and the third light beam of the wavelength $\lambda 3$. The optical film 24 reflects the linearly polarized light of the second light beam 32, whose light axis is bent by the mirror 20, that is polarized in the first polarizing direction and guides it to a ¼ wavelength plate 17 (first ¼ wavelength plate). And, the second light beam 32 is reflected by a dichroic film 26 (first reflecting surface) after being converted to circularly polarized light by the ¼ wavelength plate 17. The dichroic film 26 is an optical film that reflects the second light beam of the wavelength $\lambda 2$ and passes the third light beam of the wavelength $\lambda 3$. It should be noted that it is also possible simply to use a totally reflecting mirror in place of the dichroic film 26 if the third light beam of the wavelength $\lambda 3$ is not used, that is to say, if the optical disk 11 whose substrate thickness of the transparent substrate is t3=approximately 1.2 mm is not being recorded or reproduced. The second light beam 32 that is reflected by the dichroic film 26 passes again through the ¼ wavelength plate 17 and is converted to linearly polarized light that is polarized in a direction perpendicular to the initial polarized direction (the first polarizing direction) when it is incident on the optical element 8, then passes substantially through the optical film (the dichroic polarization separation film) 24. The second light beam 32 that passed substantially through the optical film (the dichroic polarization separation film) 24 is converted again to circularly polarized light by a ¼ wavelength plate 16 (second ¼ wavelength plate) and is then reflected by the reflecting surface 27 (the second reflecting surface) of the wave front converting element 25.

In this case, by constituting the reflecting surface 27 by, for example, a convex-surfaced mirror, it is possible to convert the wave fronts of the second light beam of the wavelength $\lambda 2$, without loss of light intensity.

Furthermore, if the second laser light source 2 has surplus light emitting capacity, because the reflecting surface 27 is constituted by a reflecting-type diffraction optical element, then the wave front converting element 25, and by extension the optical element 8, can be made smaller, lighter and at a lower cost.

Figure 4:
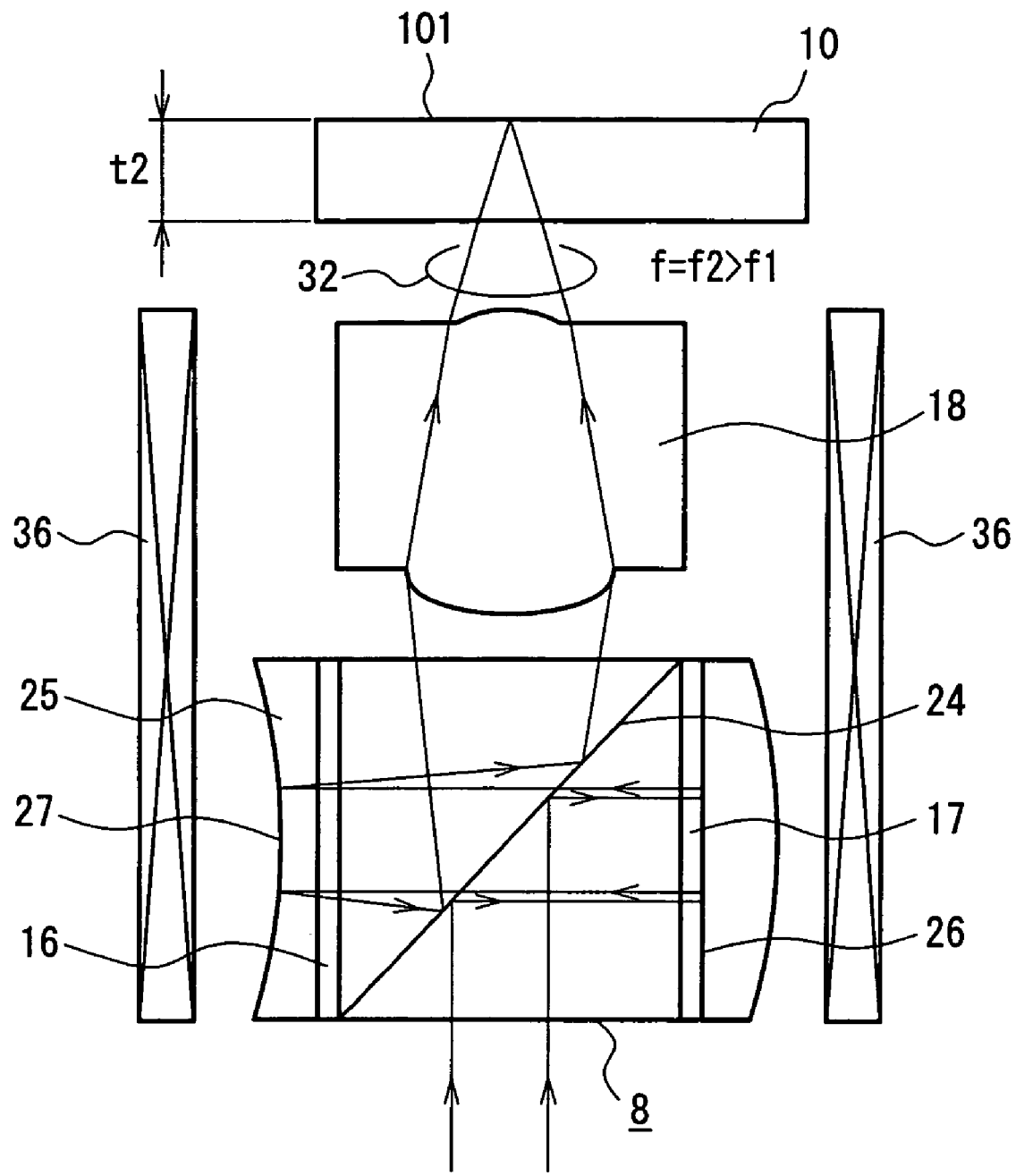
FIG. 4 is a cross-sectional view that schematically shows the state of wave front conversion of the second light beam in the optical element according to the first embodiment of the present invention.

The second light beam 32 that is both reflected and wave front converted by the reflecting surface 27 passes again through the ¼ wavelength plate 16 to be converted to linearly polarized light with a polarizing direction that is the same as the initial polarizing direction when it is incident on the optical element 8, and is then totally reflected by the optical film (the dichroic polarization separation film) 24. The second light beam 32 that is totally reflected by the optical film (the dichroic polarization separation film) 24 passes through the transparent substrate of the optical disk 10, which has a substrate thickness t2=approximately 0.6 mm, and is focused on the information recording surface 101 by the objective lens 18. Here, the substrate thickness of the transparent substrate of the optical disk 10 from the light incident surface to the information recording surface 101 is thick, at t2=approximately 0.6 mm, and it is necessary to increase the focal length f=f2 that is used when recording and reproducing the optical disk 10 and make it greater than the focal length f=f1 that is used when recording and reproducing the optical disk 9, which has the substrate thickness t1=approximately 0.1 mm (ie. f2>f1). As shown in FIG. 4, according to the present embodiment, this is achieved by making the reflecting surface 27 a convex surface and by making the second light beam a divergent light beam that is wave form converted by the action of the wave form converting element 25.

Moreover, by configuring the reflecting surface 27 as an aspherical surface rather than a spherical surface, when recording and reproducing the optical disk 10 it is possible to reduce spherical aberrations of fifth and higher orders, raise the quality of the focused wave fronts, and accurately perform recording and reproduction.

As described above, the wave front of the second light beam of the wavelength $\lambda 2$ is converted by the optical element 8. Consequently, when there are discrepancies in the relative positions of the optical element 8 and the objective lens 18, aberrations occur in the wave fronts that are incident on the optical disk 10 and focusing characteristics are degraded because the wave front is not incident on the objective lens 18 as designed. Thus, in the present embodiment, the optical element 8 and the objective lens 18 are integrally fixed, and the optical element 8 and the objective lens 18 are configured such that they are capable of being driven as a single piece by a common driving apparatus 36 when focus controlling or tracking.

As shown in FIG. 1, the second light beam that is reflected by the information recording surface of the optical disk 10 returns along the original optical path (return path), is again reflected four times within the optical element 8, and is then reflected by the beam splitter film 6, passing through the detecting lens 12 to be incident on the photodetector 13. Thus, the servo signals used for focus control and tracking control and the information signal can be obtained by calculating the power output from the photodetector 13. Furthermore, it is possible to increase the amount of light of the second light beam that is used in recording the optical disk 10 by setting the transmittance of the beam splitter film 6 with regards to the second light beam of the wavelength $\lambda 2$, so as to be greater than the reflectance of the same light beam, for example, transmittance:reflectance=7:3. Furthermore, the amount of light emitted by the second laser light source 2 can be reduced and reduction in energy consumption can be achieved by employing this configuration.

It should be noted that by also disposing a diffraction grating 15 in the optical path from the second laser light source 2 to the beam splitter film 6, it is possible to detect a tracking error signal by the method that is known in the art as the differential push pull (DPP) method.

Furthermore, as described above, instead of converting the second light beam to substantially parallel light with the collimate lens 7, it is also possible to provide a configuration in which the second light beam is converted to gently diverging light by the first convex lens 7 and the second light beam (the gently diverging light) is further converted to substantially parallel light by a second convex lens 22. Thus, in this case, by causing the second convex lens 22 to move in the direction of the light axis (horizontally, in FIG. 1) by a driving apparatus 23, the degree of parallelism of the second light beam can be changed. Incidentally, spherical aberrations occur when there is unevenness in the substrate thickness caused by discrepancies in the thickness of the transparent substrate, or when differences in substrate thickness are caused by interlayer thicknesses if the optical disk 10 is a double layer disk. However it is possible to compensate for the spherical aberrations with a minimum of additional parts.

Furthermore, if the light axis bending mirror 20 is constituted such that it is not a totally reflecting mirror, but is a semi-transparent film that passes at most 20% of the amount of light of the second light beam, such that it guides the part of the second light beam that passed the mirror 20 to the photodetector 21 by a focusing lens (convex lens) 19, then it is possible to monitor changes in the amount of light emitted by the second laser light source 2 by using the signal obtained from the photodetector 21 to feed back changes in the amount of light emitted, and to keep the amount of light emitted by the second laser light source 2 constant. Furthermore, by providing a configuration in which the third laser light source 3 is provided, optical disks 11 like CDs that have a substrate thickness t3 of the transparent substrate=approximately 1.2 mm can be recorded or played.

Furthermore, the configuration according to the present embodiment is set up so as to convert the wave front of the second light beam using the reflecting surface 27 (the second reflective surface), but it is also possible to configure it so as to convert the wave front of the second light beam by the first reflective surface, which is made from the dichroic film 26.

Figure 5:
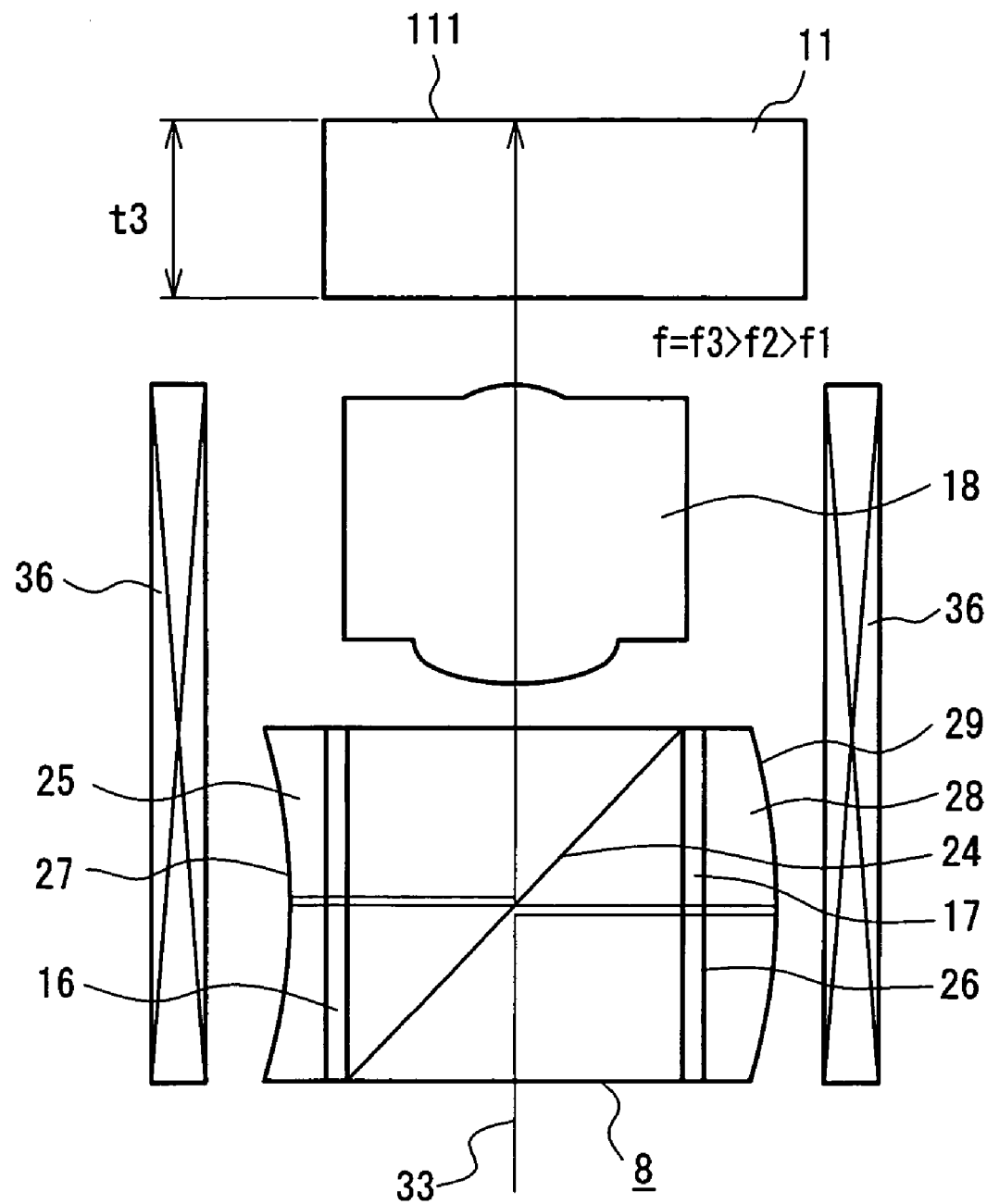
FIG. 5 is a cross-sectional view that schematically shows optical paths of a third light beam in the optical element according to the first embodiment of the present invention.

Recording and reproduction of the lowest recording density optical disk is performed by focusing the third light beam that is emitted from the third laser light source 3 onto an information recording surface 111 (see FIG. 5) of the optical disk 11 as shown below. That is to say, as shown in FIG. 1, the third light beam of the wavelength λ3, which is substantially linearly polarized light emitted from the third laser light source 3, is reflected by the wavelength selecting film (dichroic film) 14, and is then reflected by a further wavelength selecting film (dichroic film) 5 to pass through the beam splitter film 6. The third light beam that passed through the beam splitter film 6 is converted to substantially parallel light by the collimate lens 7, and the light axis of the third light beam is then bent by the mirror 20 to pass through the optical element 8 as shown in FIG. 5. That is to say, as shown in FIG. 1 and FIG. 5, the third light beam 33 whose light axis is bent by the mirror 20 is reflected four times within the optical element 8, and its wave front converted by a wave front converting element 25 (for example, an optical element having a convex curved reflecting surface 27) and a wave front converting element 28 (for example, an optical element having a concave curved reflecting surface 29). Then, the third beam 33 that passed through the optical element 8, after passing through the objective lens 18, passes through the transparent substrate of the optical disk 11, which has a substrate thickness t3=approximately 1.2 mm, and is focused onto the information recording surface 111.

A detailed description of the action of the optical element 8 is given here with reference to FIG. 5. In FIG. 5, numeral 8 indicates the optical element for performing the light path detour and wave front conversion of the second and third light beams. Furthermore, numeral 24 indicates the optical film for passing the first light beam of the wavelength λ1, which acts as a dichroic polarization separation film for the second light beam of the wavelength λ2 and for the third light beam of the wavelength λ3. The optical film 24 reflects the linearly polarized light of the third light beam 33, whose light axis is bent by the mirror 20, which is polarized in the first polarizing direction, guiding it to the ¼ wavelength plate 17 (the first wavelength plate). Then, the linearly polarized light of the third light beam 33, which is polarized in the first polarizing direction, is converted to circularly polarized light by the ¼ wavelength plate 17, then passes through the dichroic film 26. The dichroic film 26 is an optical film that reflects the second light beam of the wavelength λ2, and allows passage of the third light beam of the wavelength λ3. The third light beam 33, which passed through the dichroic film 26, is reflected by a reflecting surface 29 (third reflecting surface) of the wave front converting element 28.

In this case, by constituting the reflecting surface 29 as, for example, a concave mirror, the wave front of the third light beam of the wavelength λ3 can be converted, with no loss of light intensity.

Furthermore, if the third laser light source 3 has surplus light emitting capacity, or if the optical disk 11 is only to be replayed, because the reflecting surface 29 is constituted by a reflecting-type diffraction optical element, then the wave front converting element 28, and by extension the optical element 8, can be made smaller, lighter and at a lower cost.

Figure 6:
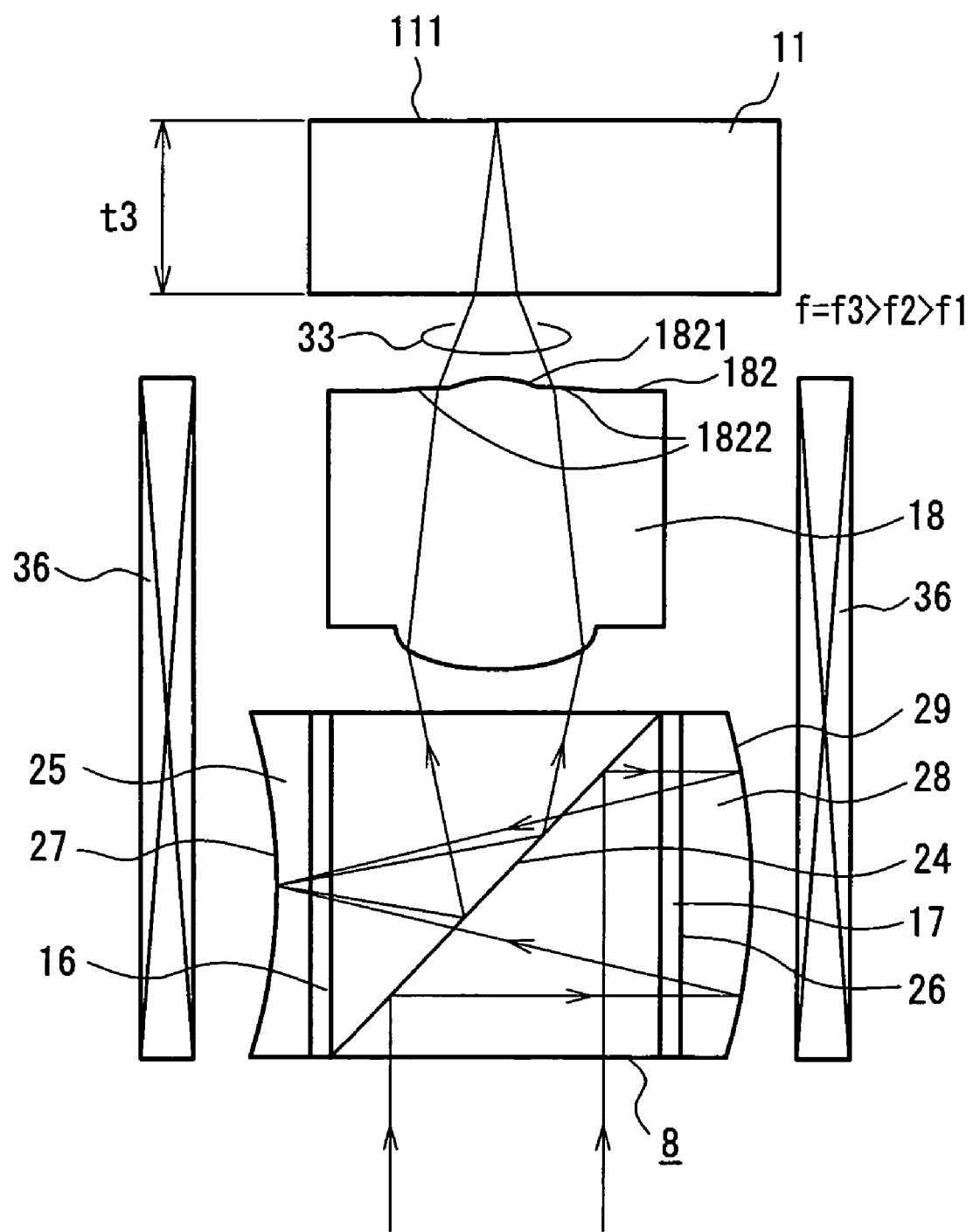
FIG. 6 is a cross-sectional view that schematically shows the state of wave front conversion of the third light beam in the optical element according to the first embodiment of the present invention.

The third light beam 33 that is both wave front converted and reflected by the reflecting surface 29 passes again through the ¼ wavelength plate 17 to be converted to linearly polarized light that is polarized in a polarizing direction perpendicular to the initial polarizing direction (first polarizing direction) when incident on the optical element 8, and then passes substantially completely through the optical film (the dichroic polarization separation film) 24. The third light beam 33 that passed substantially completely through the optical film (dichroic polarization separation film) 24 is converted again to circularly polarized light by the ¼ wavelength plate 16 (the second ¼ wavelength plate) and then is reflected by the reflecting surface 27 of the wave front converting element 25. The third light beam 33 that is both reflected and wave front converted by the reflecting surface 27 again passes through the ¼ wavelength plate 16 and is converted to linearly polarized light that is polarized in the same direction (the first polarizing direction) as when it is first incident on the optical element 8, and then is reflected completely by the optical film (dichroic polarization separation film) 24. Then, the third light beam 33 that is reflected completely by the optical film (dichroic polarization separation film) 24 passes through the transparent substrate of the optical disk 11, which has a substrate thickness t3=approximately 1.2 mm, and is focused onto the information recording surface 111 by the objective lens 18. Here, the substrate thickness of the optical disk 11 from the light incident surface to the information recording surface 111 is thick, at t3=approximately 1.2 mm, and it is necessary to increase the focal length f=f3 that is used when recording and reproducing the optical disk 11 and make it greater than the focal length f=f2 that is used when reproducing or recording the optical disk 10, which has the substrate thickness t2=approximately 0.6 mm (f3>f2). As shown in FIG. 6, according to the present embodiment, this is achieved by configuring the reflecting surface 29 as a concave surface, together with the reflecting surface 27 as a convex surface, focusing the reflected light from the reflecting surface 29, and then configuring the third light beam as a diverging light beam by wave front conversion with the wave front converting element 25.

Moreover, by configuring the reflecting surface 29 as an aspherical surface rather than a spherical surface, when recording and reproducing the optical disk 11 it is possible to reduce spherical aberrations of fifth and higher powers, raise the quality of the focused wave fronts, and accurately perform recording and reproduction.

As described above, the wave front of the third light beam of the wavelength λ3 is converted by the optical element 8. Consequently, when there are discrepancies in the relative positions of the optical element 8 and the objective lens 18, aberrations occur in the wave fronts that are incident on the optical disk 11 and focusing characteristics are degraded because the wave front is not incident on the objective lens 18 as designed. Thus, in the present embodiment as described above, the optical element 8 and the objective lens 18 are integrally fixed, and the optical element 8 and the objective lens 18 are configured such that they are capable of being driven as a single piece by a common driving apparatus 36 when focus controlling or tracking.

As shown in FIG. 1, the third light beam that is reflected by the information recording surface of the optical disk 11 returns along the original optical path (return path), again is reflected four times within the optical element 8, and then is reflected by the beam splitter film 6, passing through the detecting lens 12 to be incident on the photodetector 13. Thus, the servo signals used for focus control and tracking control and the information signal can be obtained by calculating the power output from the light detecting device 13. Furthermore, it is possible to increase the amount of light of the third light beam used in recording the optical disk 11 by setting the transmittance of the beam splitter film 6 with regards to the third light beam of the wavelength λ3, to be greater than the reflectance of the same light beam, for example, transmittance:reflectance=7:3. Furthermore, the amount of light emitted by the third laser light source 3 can be reduced and reduction in energy consumption can be achieved by employing this configuration.

It should be noted that by also disposing a diffraction grating 15 in the optical path from the third laser light source 3 to the beam splitter film 6, it is possible to detect a tracking error signal by the method that is known in the art as the differential push pull (DPP) method.

Furthermore, as described above, instead of converting the third light beam to substantially parallel light with the collimate lens 7, it is also possible to provide a configuration in which the third light beam is converted to gently diverging light by the first convex lens 7 and the third light beam (the gently diverging light) is further converted to substantially parallel light by a second convex lens 22. Thus, in this case, by causing the second convex lens 22 to move in the direction of the light axis (horizontally, in FIG. 1) by a driving apparatus 23, the degree of parallelism of the third light beam can be changed. Incidentally, spherical aberrations occur when there is unevenness in the substrate thickness caused by discrepancies in the thickness of the transparent substrate, or when differences in substrate thickness are caused by interlayer thicknesses if the optical disk 11 is a double layer disk. However it is possible to compensate for the spherical aberrations with a minimum of additional parts.

Furthermore, if the light axis bending mirror 20 is constituted such that it is not a totally reflecting mirror, but is a semi-transparent film that passes at most 20% of the amount of light of the third light beam, such that it guides the part of the third light beam that passed the mirror 20 to the photodetector 21 by a focusing lens (convex lens) 19, then it is possible to monitor changes in the amount of light emitted by the third laser light source 3 by using the signal obtained from the photodetector 21 to feed back changes in the amount of light emitted and to keep the amount of light emitted by the third laser light source 3 constant.

Next, the shape of a second surface (the surface near the optical disk) of the objective lens will be explained with reference to FIG. 6 to FIG. 9.

As described above, in order to be able to provide compatibility with transparent substrates that have a thicker substrate, when the optical disk 10 or optical disk 11 is recorded or reproduced, it is necessary to lengthen the focal distance f2 when the optical disk 10 is recorded or reproduced, and the focal distance f3 when the optical disk 11 is recorded or reproduced, to be longer than the focal length f1 when the optical disk 9 is recorded or reproduced. Consequently, the necessary effective diameter of a second surface 182 of the objective lens 18 is larger when reproducing or recording the optical disk 11 than when reproducing or recording the optical disk 9, although the NA is smaller.

Figure 7:
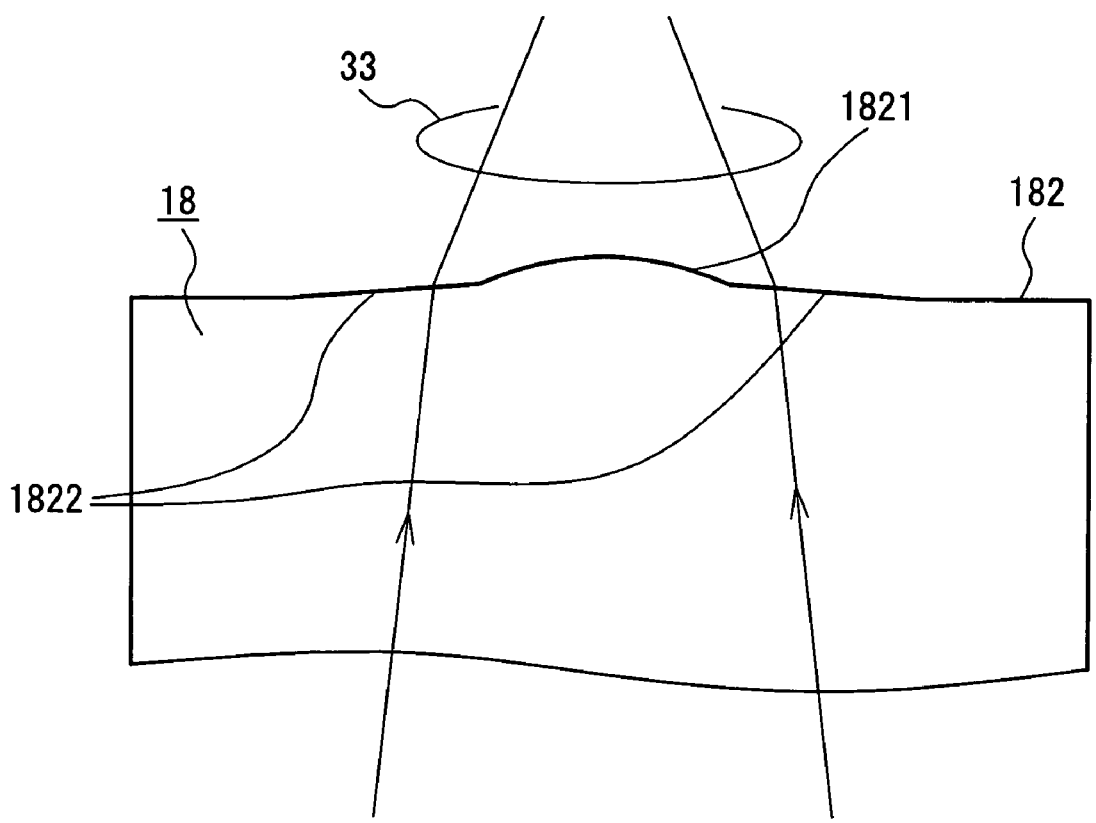
FIG. 7 is a cross-sectional overview of a shape of the surface that is near the optical disk of an objective lens, according to the first embodiment of the present invention.

For example, when recording or reproducing at NA=0.5 with respect to the optical disk 11, then the third light beam 33 passes through a wider range than that of an effective region (a first region 1821) that is used when recording and reproducing the optical disk 9, as shown in FIG. 6 and FIG. 7. Thus, in the outside circumferential portion that is outside the effective region (the first region 1821) of the objective lens 18 when recording or reproducing the disk 9, that is to say, in a region that is far from the light axis (a second region 1822), an aspherical region is provided for recording or reproducing with the third light beam of the wavelength λ3, at an NA of 0.5, with respect to the optical disk 11, whose recording density is low and which has a transparent substrate with a thick substrate. Thus, the second surface 182 of the objective lens 18 is partitioned into a plurality of concentric ring shaped regions, such that in an outer circumferential region an aspherical region is provided for recording and reproducing at a lower NA and with a longer wavelength light beam with respect to the optical disk 11 whose recording density is low and which has a transparent substrate that is thick, so that as shown in FIG. 2 and FIG. 6 the focal length is changed, allowing recording and reproduction of the plurality of different types of optical disks 9 and 11 to be performed. It should be noted that, by the design of the focal length for example, the second light beam 32 passes through a wider effective region (the first region 1821) when recording and reproducing the optical disk 10 than when recording and reproducing the optical disk 9, thus allowing both the optical disk 9 and optical disk 10 to be recorded and reproduced (see FIG. 4).

Figure 8:
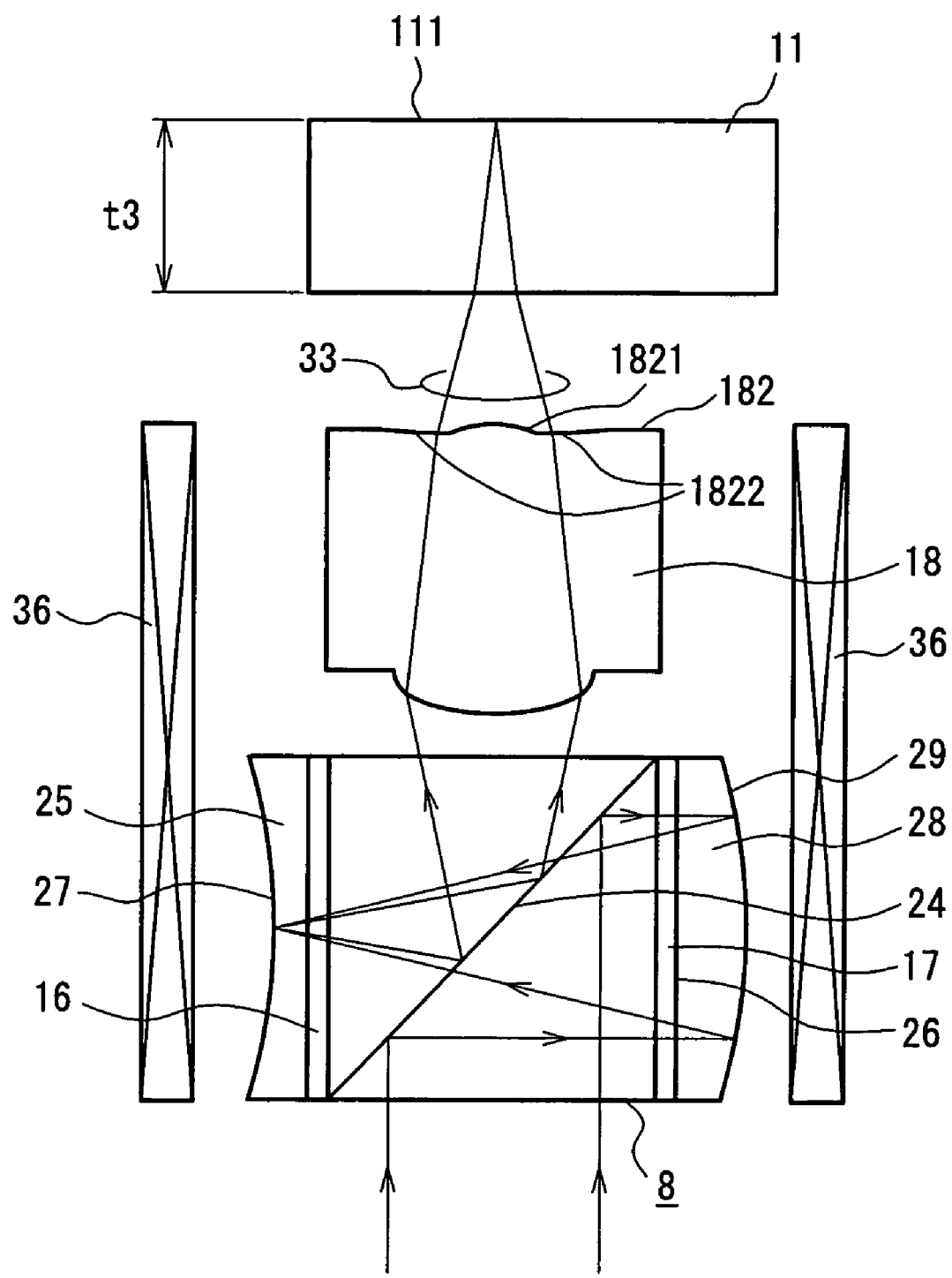
FIG. 8 is a cross-sectional view of the structure in the vicinity of the objective lens if the objective lens uses another shape, according to the first embodiment of the present invention.
Figure 9:
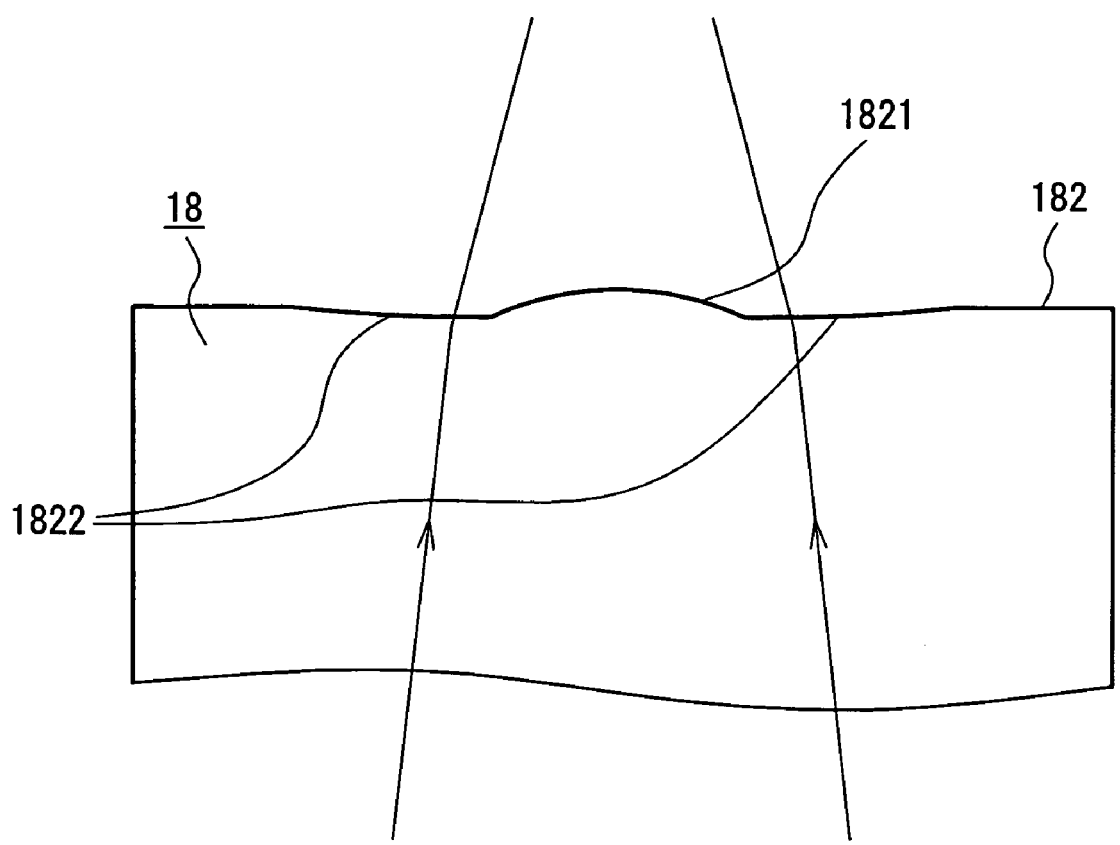
FIG. 9 is a cross-sectional overview of a shape of the surface of the objective lens that is near the optical disk, which has another shape according to the first embodiment of the present invention.

Moreover, as shown in FIG. 8 and FIG. 9, by configuring the second region 1822 of the second surface 182 of the objective lens 18 as a concave-shaped aspherical surface, it is possible to set the convex curved reflecting surface 27 of the wave front converting element 25 to be gently curved, and as a result, it is possible to fabricate the wave front converting element 25 with greater ease.

Furthermore, according to the present embodiment as shown in FIGS. 3 to 6, because it is possible to cause the light beam to be incident on the wave front converting optical element 8 from directly below the objective lens 18, it is possible to enlarge the design of the driving apparatus 36 that drives the optical element 8 and the objective lens 18 as a single piece. As a result, it is possible to devise a driving apparatus 36 with superior characteristics, such as frequency characteristics when focusing or tracking.

Second Embodiment

Figure 10:
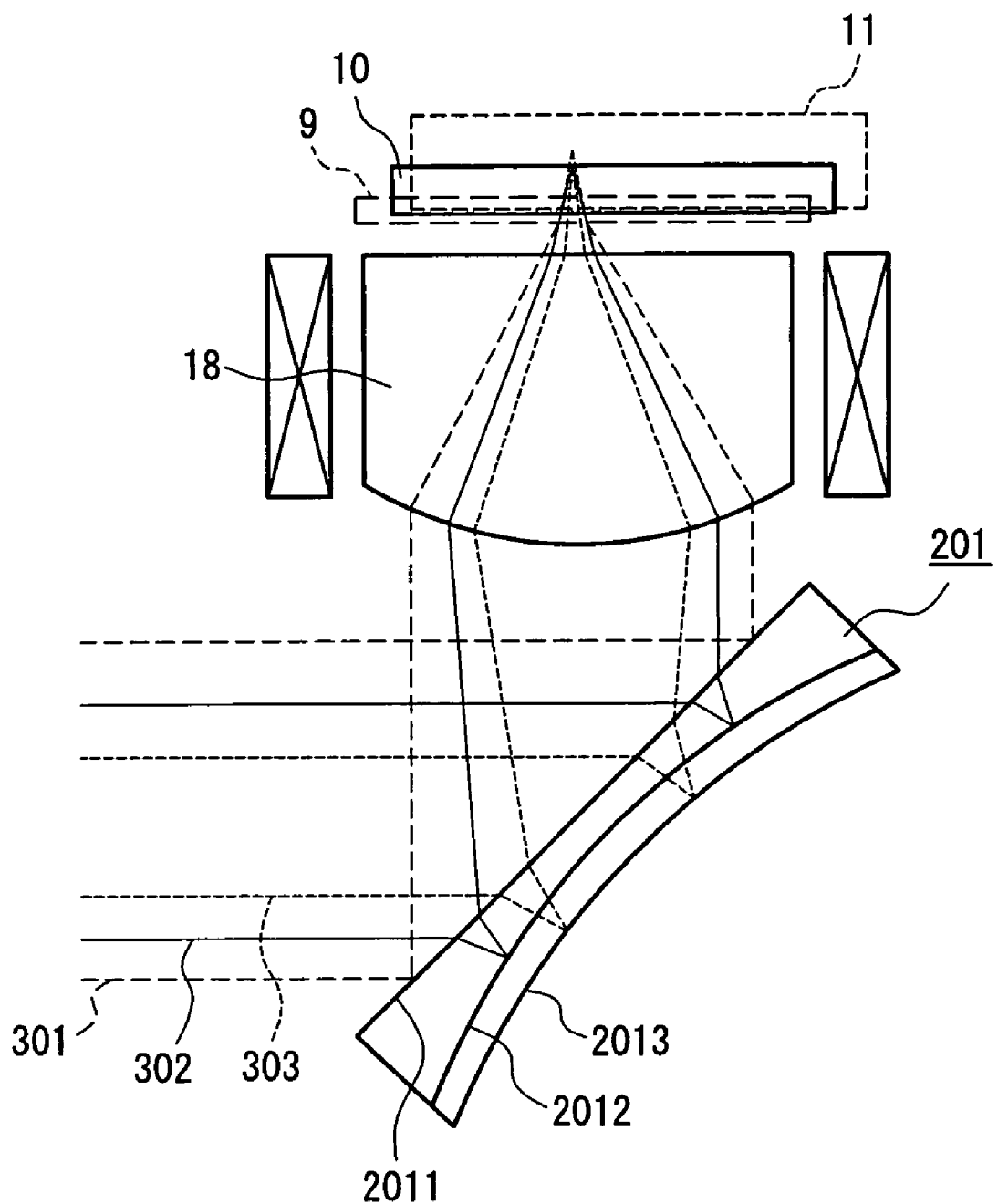
FIG. 10 is a cross-sectional overview showing a configuration of the vicinity of the objective lens of the optical head device according to a second embodiment of the present invention.

FIG. 10 is a cross-sectional view that schematically shows a configuration of the vicinity of the objective lens of an optical head device according to a second embodiment of the present invention.

According to the present embodiment, the structure up to where the light beam emitted from the laser light source is changed to substantially parallel light, and the structure for detecting the servo signal and the information signal in the return path, are the same as in the first embodiment described above (see FIG. 1). Furthermore, as shown in FIG. 10, according to the present embodiment, a mirror 201 that is substituted for the mirror 20 for bending the light axis is used, and the optical element 8 is not used.

The mirror 201 has a first reflecting surface 2011 made from a flat surface for the purpose of reflecting the first light beam of the wavelength λ1 toward the optical disk, and second and third reflecting surfaces 2012 and 2013 made from aspherical surfaces having different radii of curvature for the purpose of reflecting the second light beam of the wavelength λ2 and the third light beam of the wavelength λ3 toward their respective optical disks.

The first reflecting surface 2011 is constituted by a dichroic film, which totally reflects, as is, the substantially parallel light of the first light beam 301 of the wavelength λ1 that is emitted from the first laser light source 1 toward the objective lens 18, while totally passing the second light beam 302, which has a wavelength λ2, and the third light beam 303, which has the wavelength λ3 that are emitted respectively from the second and third laser light sources 2 and 3. Furthermore, the second reflecting surface 2012 is constituted by a dichroic film, such that it totally reflects the light of the second light beam 302 of the wavelength λ2 that is emitted from the second laser light source 2, changing it to a light bundle having an optimal angle of expansion with respect to the objective lens 18, and also totally passes the third light beam 303 of the wavelength λ3 that is emitted from the third laser light source 3. Furthermore, the third reflecting surface 2013 is constituted by a totally reflecting film, such that it totally reflects the light of the third light beam 303 of the wavelength λ3 that is emitted from the third laser source, and changes it to a light bundle having an optimal angle of expansion with respect to the objective lens 18.

Because the mirror 201 is constituted in the above manner, by selecting the reflecting surface appropriate to the laser light source and type of optical disk so that the wave fronts of the light beams 301 to 303 are converted, the plurality of different types of optical disks 9 to 11 can be recorded and reproduced interchangeably.

Furthermore, by employing the construction given above, it is possible to attain two effects such as given below when compared to the first conventional example. First, by configuring the first reflecting surface as a flat surface, it is possible to allow the first light beam of the wavelength λ1 to be incident on the objective lens 18 as substantially parallel light. Thus even if there are fluctuations in the relative positions of the objective lens 18 and the mirror 201 during recording and replaying of the optical disk 9 whose recording density is the highest and which requires the greatest aberration suppression, no aberrations occur. Furthermore, because the second reflecting surface 2012 and the third reflecting surface 2013 are constituted by aspherical surfaces, fifth and higher order aberrations can be reduced, and as a result, excellent recording on or reproduction of the optical disks 10 and 11 is possible.

Figure 11:
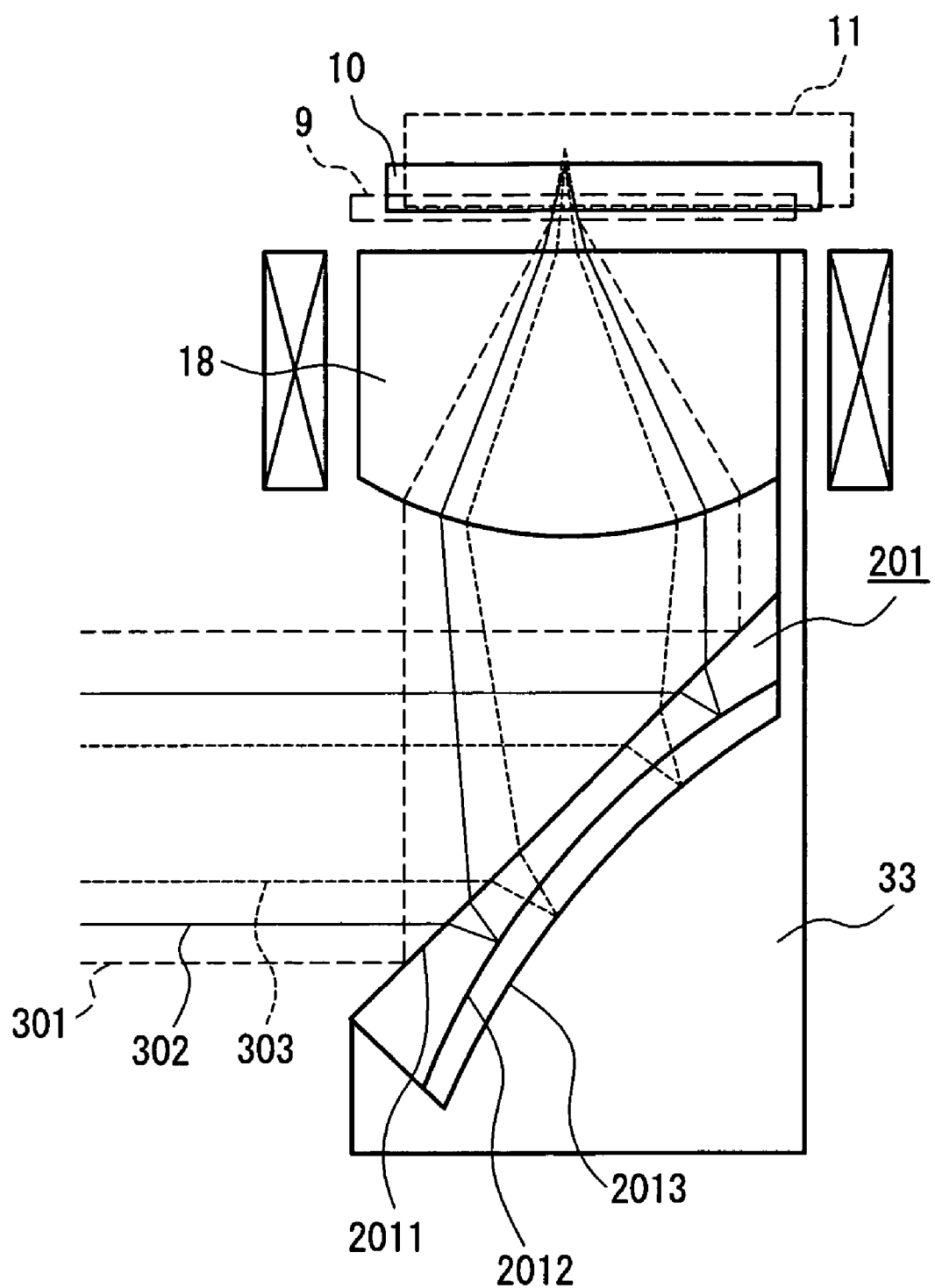
FIG. 11 is a cross-sectional overview showing another configuration of the vicinity of the objective lens of the optical head device according to the second embodiment of the present invention.

Moreover, as shown in FIG. 11, it is possible to suppress the occurrence of aberrations even if the objective lens 18 moves due to tracking during the recording or reproduction of the optical disks 10 or 11, by integrally fixing the objective lens 18 and the mirror 201 with a supporting member 33, and as a result, it is possible to carry out excellent recording or reproduction of the optical disks 10 and 11.

Third Embodiment

Figure 12:
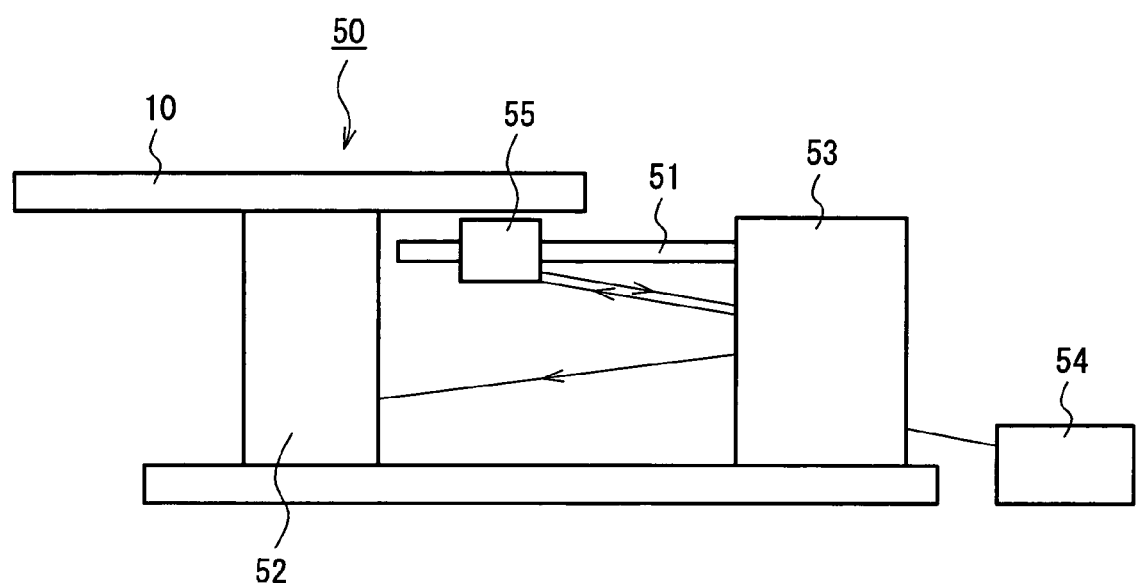
FIG. 12 structural overview showing an optical information apparatus according to a third embodiment of the present invention.

FIG. 12 is a structural view that schematically shows an optical information device according to the third configuration of the present invention. As shown in FIG. 12, the optical disk 10 (or 9 or 11, this is the same below) is rotatably driven by an optical disk drive portion 52 that is provided with a motor or the like (if an optical card is used in place of the optical disk 10, then the card is translatably driven). Numeral 55 indicates the optical head device shown in the first and second embodiments, and the optical head device 55 is coarsely adjusted by an optical head device drive apparatus 51 to where the track containing the desired information is present on the optical disk 10.

Furthermore, in accordance with the positional relationship with the optical disk 10, the optical head device sends a focus error signal and tracking error signal to an electric circuit 53, which acts as a control portion. The electric circuit 53 sends signals for the purpose of fine controlling the objective lens to the optical head device 55 in accordance with these signals. Thus, based on these signals, the optical head device 55 carries out focus control and tracking control of the disk 10, and then reads, records or erases information. Furthermore, the electric circuit 53 also controls the optical disk drive 52 and the laser light sources within the optical head device 55 in accordance with the signals obtained from the optical head device 55. It should be noted that in FIG. 12 numeral 54 indicates a power source or a connecting portion to an external power source.

In the optical information apparatus 50 of the present embodiment, the optical head device of the present invention, illustrated in the first and second embodiments described above as small, low cost and capable of achieving an excellent quality information signal even considering the movement of the objective lens due to tracking, is used as the optical head device 55, and thus it is possible to achieve a small optical information apparatus capable of accurately and stably reproducing information at low cost.

Fourth Embodiment

Figure 13:
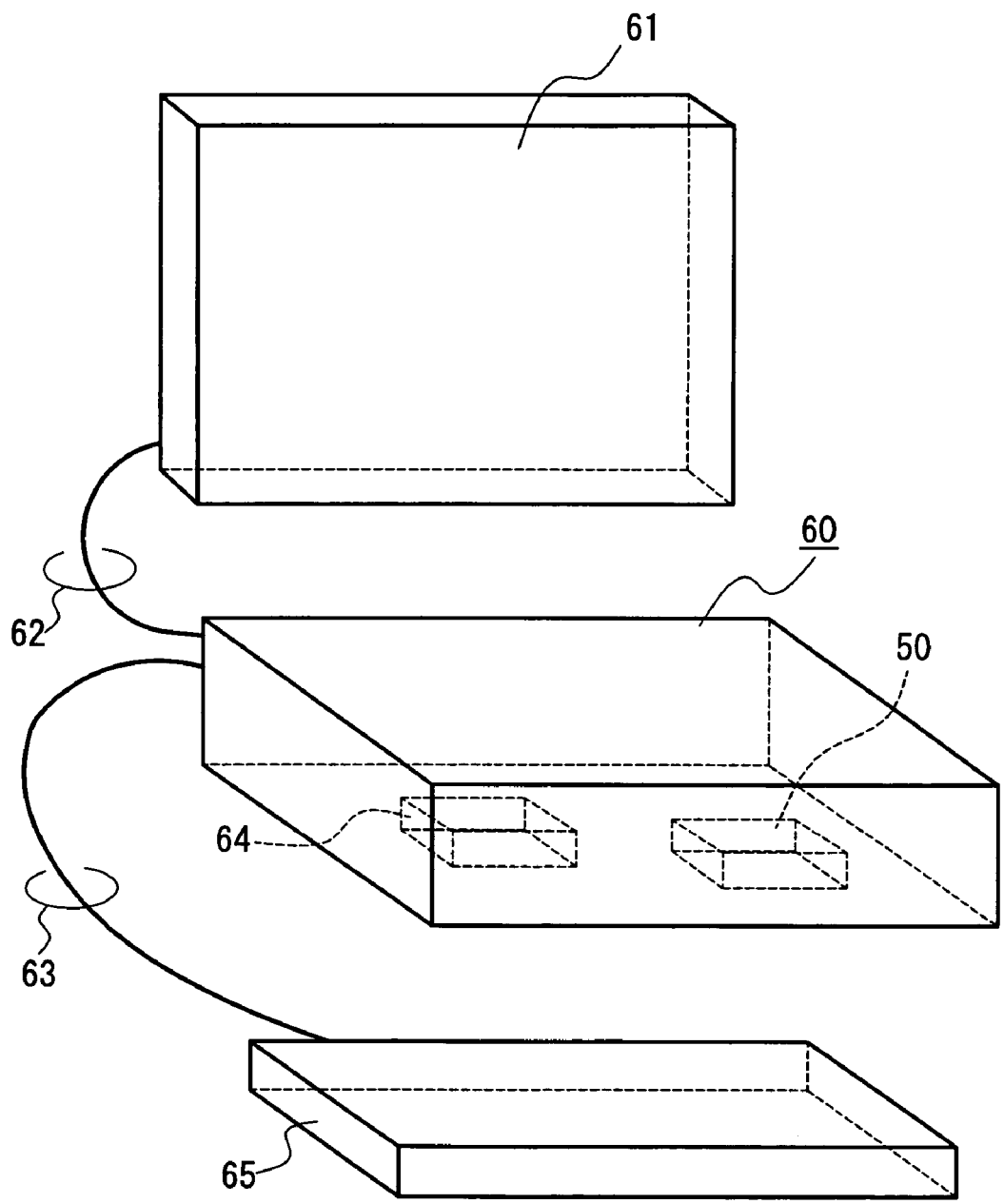
FIG. 13 is a perspective overview showing a computer according to a fourth embodiment of the present invention.

FIG. 13 is a perspective view that schematically shows a computer according to the fourth embodiment of the present invention.

As shown in FIG. 13, a computer 60 according to the present embodiment is constituted by the optical information apparatus 50 of the third embodiment described above, an input device 65 for the purpose of inputting information, such as a keyboard, a mouse, or a touchpanel, a processing unit 64 such as central processing unit (CPU) for the purpose of processing in accordance with information input from the input device 65 via an input cable 63 or read out from the optical information apparatus 50, an output device 61 such as a cathode ray tube, liquid crystal display or printer, for the purpose of displaying or outputting the information input from the input device 65, the information read out from the optical information apparatus 50 or the information that is a result calculated by the processing unit 64. It should be noted that in FIG. 13, numeral 62 indicates an output cable for the purpose of outputting information to the output device 61 such as the results calculated by the processing unit 64.

Fifth Embodiment

Figure 14:
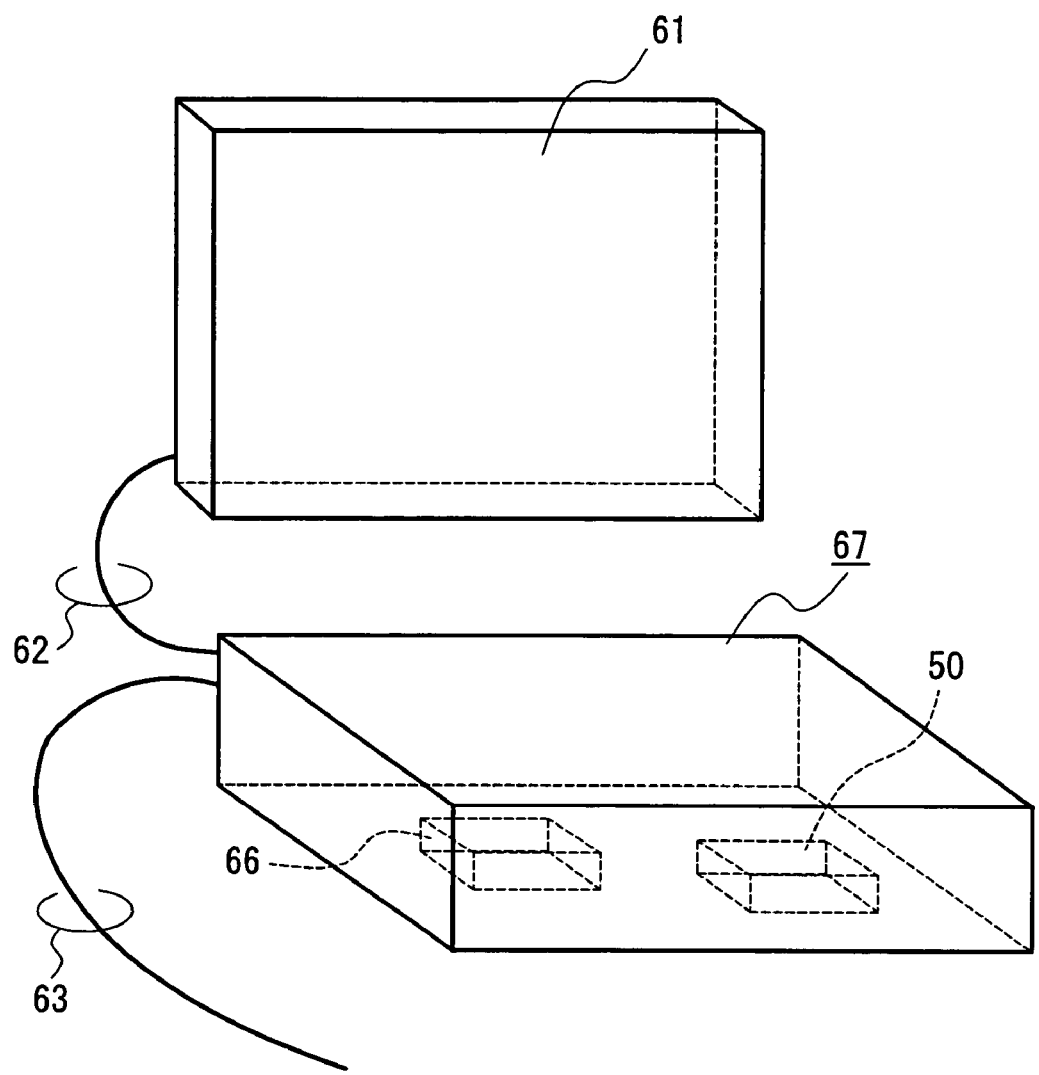
FIG. 14 is a perspective overview showing an optical disk player according to a fifth embodiment of the present invention.

FIG. 14 is a perspective view that schematically shows an optical disk player according to the fifth embodiment of the present invention.

As shown in FIG. 14, an optical disk player 67 according to the present embodiment is provided with an optical information apparatus 50 according to the third embodiment, and an information-to-image conversion device (such as a decoder 66) for converting an information signal obtained from the optical information apparatus 50 into an image.

It should be noted that it is also possible to utilize the present configuration as a car navigation system. Furthermore, it is also possible to set this configuration such that the output device 61 such as cathode ray devices, liquid crystal devices and printers are connected via the output cable 62.

Sixth Embodiment

FIG. 15 is a perspective view that schematically shows an optical disk recorder according to the sixth embodiment of the present invention.

As shown in FIG. 15, an optical disk recorder 71 according to the present embodiment is provided with the optical information apparatus 50 according to the third embodiment, and an image-to-information converter (such as an encoder 68), for converting image information into information for recording onto the optical disk by the optical information apparatus 50.

It should be noted that it is possible to have a configuration that includes an information-to-image conversion device (such as the decoder 66) that converts the information signal obtained from the optical information apparatus 50 to images, and thus, it is possible to simultaneously display on a monitor during recording to the optical disk, or to reproduce portions that are already recorded.

Furthermore, it is also possible to configure the optical disk recorder such that output devices such as cathode ray devices, liquid crystal devices or printers are connected via the output cable 62.

Computers, optical disk players and optical disk recorders provided with the optical information apparatus 50 described according to the third embodiment, or employing methods for recording and reproducing described above are capable of stably recording or reproducing a plurality of optical disks of different varieties, so that it is possible to use them in a wide range of applications.

Seventh Embodiment

Figure 16:
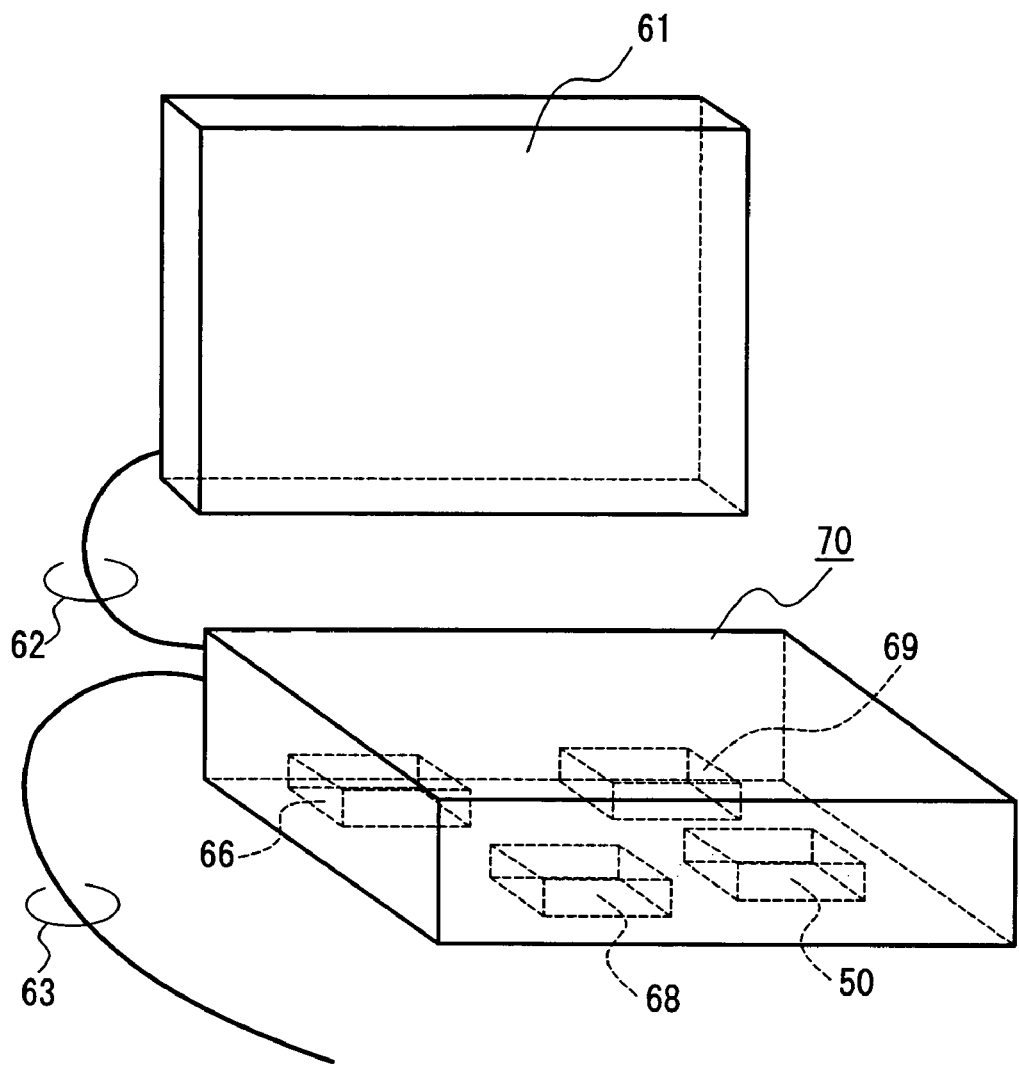
FIG. 16 is a perspective overview showing an optical disk server according to a seventh embodiment of the present invention.
Figure 17:
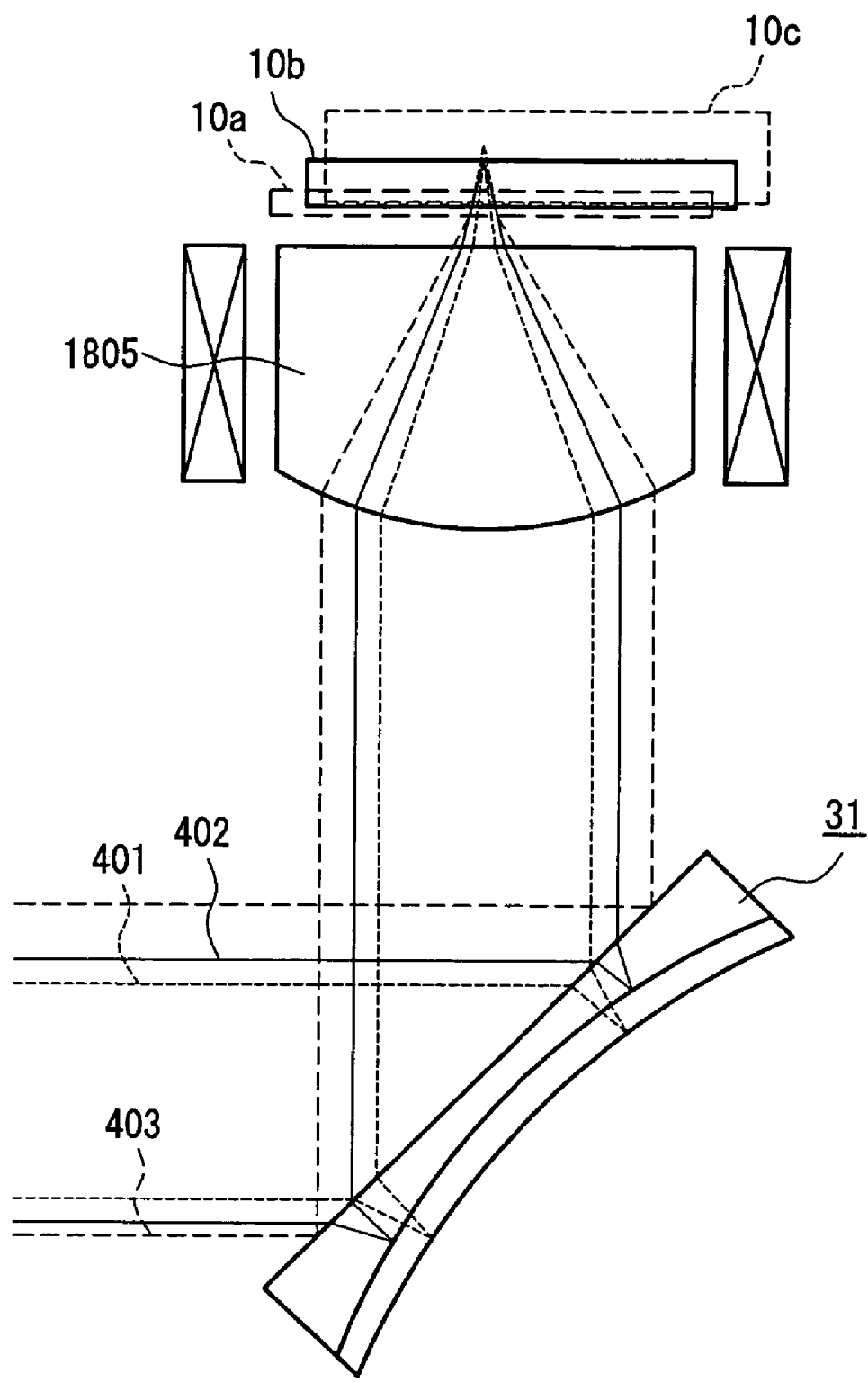
FIG. 17 is a cross-section overview showing the structure around the objective lens of an optical head device according to the conventional art.
Figure 18:
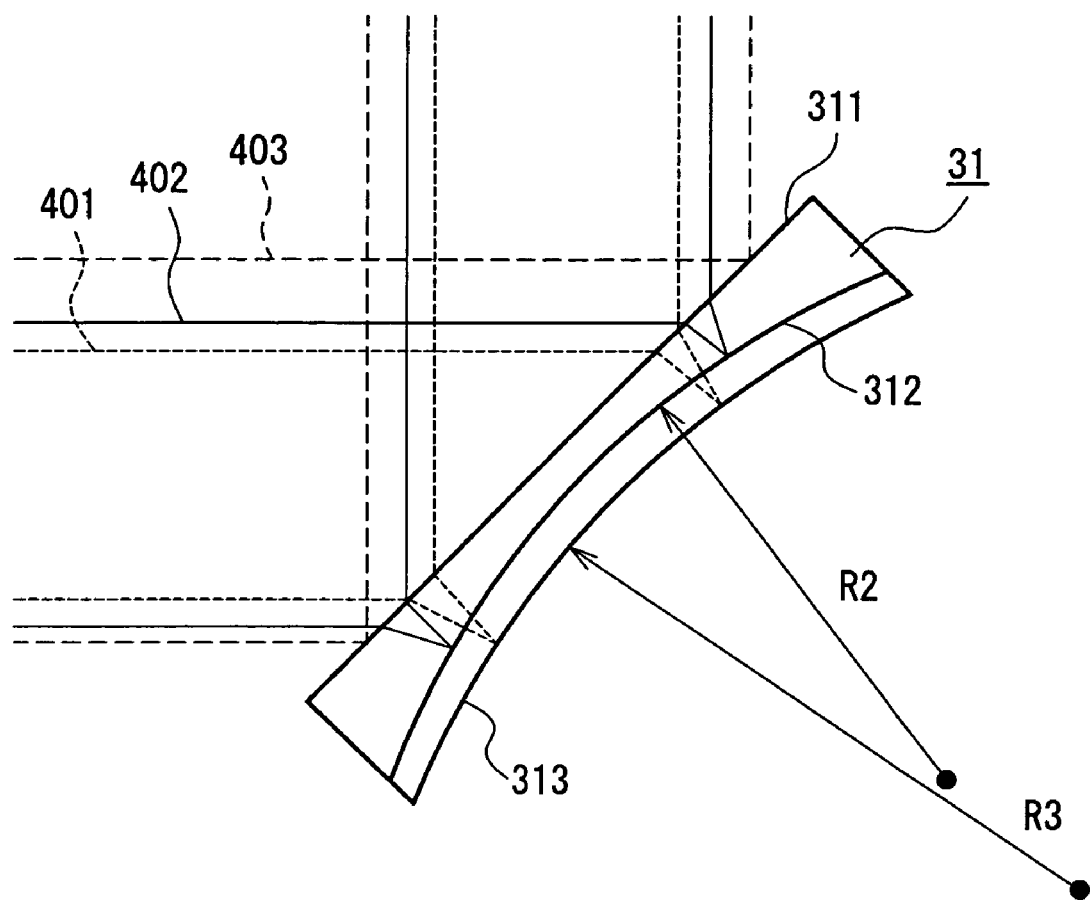
FIG. 18 is a cross-sectional overview of a mirror that is used for the purpose of bending an optical axis, used in the optical head device according to the conventional art.

FIG. 16 is a perspective view that schematically shows an optical disk server according to the seventh embodiment of the present invention.

As shown in FIG. 16, an optical disk server 70 of the present embodiment is provided with the optical information apparatus 50 described above according to the third embodiment, and an input/output wireless terminal (wireless input/output terminal) 69 that is a wireless receiving device and transmitting device for the purpose of reading in information from an external portion for recording to the optical information apparatus 50, and for output to an external portion of information read out by the optical information apparatus 50 (ie. for the purpose of exchanging information with an external portion).

By the structure above, it is possible to utilize the optical disk server 70 as a shared information server that exchanges information back and forth with devices that contain a plurality of wireless receiving and transmitting terminals, such as computers, telephones and television tuners. Furthermore, as a plurality of differing varieties of optical disks can be stably recorded and reproduced, the optical disk server 70 can be used in a wide range of applications.

It should be noted that a configuration is also possible in which an image-to-information converting device (such as the encoder 68) is added so as to convert the image information into information for recording onto the optical disk by the optical information apparatus 50.

Furthermore, it is also possible to have a configuration in which an information-to-image converting device (such as the decoder 66) is added that converts the signal obtained from the optical information apparatus 50 to images, and thus it is possible to display simultaneously on a monitor during recording to the optical disk, or reproduce portions already recorded.

Furthermore, it is also possible to configure the optical disk server such that output devices such as cathode ray devices, liquid crystal devices or printers are connected via the output cable 62.

Furthermore, according to the fourth to seventh embodiments, the output device 61 is shown in FIGS. 13 to 16, but by simply providing an output terminal without the output device 61, a merchandising model is also possible in which this is sold separately. Furthermore, input devices are not shown in FIGS. 14 to 16, however a merchandising model is also possible in which input devices such as keyboards, mouses or touchpanels are provided.

Furthermore, it is possible to obtain a similar effect as an optical disk even if an optical card is used as the optical information medium according to the present invention, instead of the optical disk. That is to say, the present invention can be applied to all optical information media that are recorded or reproduced by the formation of minute focused spots.

The invention claimed is:

1. An optical element, comprising:
a dichroic polarization separation film for passing a first light beam of wavelength $\lambda 1$, reflecting linearly polarized light of a second light beam of wavelength $\lambda 2$ that is polarized in a first polarizing direction, and passing linearly polarized light of the second light beam that is polarized in a direction perpendicular to the first polarizing direction;
a first ¼ wavelength plate for converting the linearly polarized light of the second light beam that is polarized in the first polarizing direction and reflected by the dichroic polarization separation film, into substantially circularly polarized light;
a first reflecting surface for reflecting the second light beam that is converted to circularly polarized light by the first ¼ wavelength plate;
a second ¼ wavelength plate for converting again the second light beam that is reflected at the first reflecting surface, that is converted to linearly polarized light with a polarizing direction perpendicular to the first polarizing direction by the first ¼ wavelength plate and passed by the dichroic polarization separation film, into substantially circularly polarized light; and a second reflecting surface for reflecting the second light beam that is converted to substantially circularly polarized light by the second ¼ wavelength plate;

wherein the optical element reflects by the dichroic polarization separation film the second light beam that is reflected by the second reflecting surface and converted to linearly polarized light polarized in the first polarizing direction by the second ¼ wavelength plate; and wherein the optical element converts the wave front of the second light beam.

2. The optical element according to claim 1, wherein the first or the second reflecting surfaces are curved surfaces, and the wave front of the second light beam is converted by the curved surface.

3. The optical element according to claim 2, wherein the curved surface that converts the wave front of the second light beam is a convex surface.

4. The optical element according to claim 1, wherein the first or second reflecting surface is a reflective diffraction optical element, and the wave front of the second light beam is converted by the diffracting optical element.

5. The optical element according to claim 1, wherein the dichroic polarization separation film also reflects linearly polarized light of a third light beam of wavelength $\lambda 3$, that is polarized in the first polarizing direction and passes the linearly polarized light of the third light beam that is polarized in a direction perpendicular to the first polarizing direction;

wherein the first ¼ wavelength plate converts the linearly polarized light of the third light beam that is polarized in the first polarizing direction and reflected by the dichroic polarization separation film into substantially circularly polarized light;

wherein the second ¼ wavelength plate converts again the third light beam reflected at the first reflecting surface that is converted to linearly polarized light with a polarizing direction perpendicular to the first polarizing direction by the first ¼ wavelength plate and passed by the dichroic polarization separation film, into substantially circularly polarized light; and wherein the optical element reflects by the dichroic polarization separation film the third light beam that is reflected by the second reflecting surface and that is converted to linearly polarized light polarized in the first polarizing direction by the second ¼ wavelength plate; and wherein the optical element converts the wave front of the third light beam.

6. The optical element according to claim 5, wherein the reflecting surface of the first or second reflecting surface that is different from the reflecting surface that converts the wave front of the second light beam is a curved surface, and the wave front of the third light beam is converted by that curved surface.

7. The optical element according to claim 6, wherein the curved surface that converts the wave front of the third light beam is a concave surface.

8. The optical element according to claim 5, wherein the reflecting surface of the first or second reflecting surface that is different from the reflecting surface that converts the wave front of the second light beam is a reflective diffraction optical element, and the wave front of the third light beam is converted by the diffraction optical element.

9. The optical element according to claim 6, further comprising:

a dichroic film for passing the third light beam and reflecting the second light beam, which is provided between the reflecting surface of the first or second reflecting surface that is different from the reflecting surface that converts the wave front of the second light beam, and the dichroic polarization separation film.

10. An optical head device, comprising:

a first laser light source for emitting a first light beam of wavelength $\lambda 1$;

a second laser light source for emitting a second light beam of wavelength $\lambda 2$; and an objective lens for focusing the first and second light beams emitted from the first and second laser light sources respectively onto first and second optical information media;

wherein the optical element according to claim 1 is provided between the first and second laser light sources and the objective lens.

11. The optical head device according to claim 10, wherein the optical element and the objective lens are fixed to move as a single piece.

12. The optical head device according to claim 10, which satisfies the following Expressions 1:

$$\lambda 1 < \lambda 2$$

$$t1 < t2$$

$$f1 < f2 \qquad \text{Expressions 1}$$

where t1 is the substrate thickness of the first optical information recording medium, t2 is the substrate thickness of the second optical information recording medium, f1 is the focal length when focusing the first light beam onto the information recording surface of the first optical information recording medium and f2 is the focal length when focusing the second light beam onto the information recording surface of the second optical information recording medium.

13. The optical head device according to claim 10, wherein the first light beam of wavelength $\lambda 1$ passes through the transparent substrate of substrate thickness t1 and is focused on the information recording surface of the first optical information recording medium by the objective lens; and wherein the first optical information medium records information at a higher density than the second optical information medium;

wherein a second region is provided on the surface of the objective lens near the optical information medium at a circumferential portion of a first region through which the first light beam passes; and wherein the second light beam passes through the transparent substrate of substrate thickness $t2(>t1)$ and is focused on the information recording surface of the second optical information medium when the second light beam of wavelength $\lambda 2(>\lambda 1)$ passes through the second region.

14. The optical head device according to claim 13, wherein the second region has a convex surface shape.

15. An optical head device, comprising:

a first laser light source for emitting a first light beam of wavelength $\lambda 1$;

a second laser light source for emitting a second light beam of wavelength λ2;

a third laser light source for emitting a third light beam of wavelength λ3; and an objective lens for focusing the first to third light beams emitted from the first to third laser light sources respectively onto first to third optical information media;

wherein the optical element according to claim 5 is provided between the first to third laser light sources and the objective lens.

16. The optical head device according to claim 15, wherein the optical element and the objective lens are fixed to move as a single piece.

17. The optical head device according to claim 15, which satisfies the following Expression 2:

$$\lambda 1<\lambda 2<\lambda 3$$

$$t1<t2<t3$$

$$f1<f2<t3 \qquad \text{Expression 2}$$

where t1 is the substrate thickness of the first optical information recording medium, t2 is the substrate thickness of the second optical information recording medium, t3 is the substrate thickness of the third optical information recording medium, f1 is the focal length when focusing the first light beam onto the information recording surface of the first optical information recording medium, f2 is the focal length when focusing the second light beam onto the information recording surface of the second optical information recording medium and f3 is the focal length when focusing the third light beam onto the information recording surface of the third optical information recording medium.

18. The optical head device according to claim 15, wherein the first light beam of wavelength λ1 passes through the transparent substrate of substrate thickness t1 and is focused on the information recording surface of the first optical information recording medium by the objective lens; and wherein the first optical information medium records information at a higher density than the third optical information medium;

wherein a second region is provided on the surface of the objective lens near the optical information medium at a circumferential portion of a first region through which the first light beam passes; and wherein the third light beam passes through the transparent substrate of substrate thickness t3(>t1) and is focused on the information recording surface of the third optical information medium when the third light beam of wavelength λ3(>λ1) passes through the second region.

19. The optical head device according to claim 18, wherein the second region has a convex surface shape.

20. The optical head device according to claim 10, further comprising:

a first convex lens for receiving a light beam emitted from a laser light source, and converting the light beam into gently diverging light; and a second convex lens that converts the light beam that is converted to gently diverging light by the first convex lens to substantially parallel light.

21. An optical information apparatus, comprising:

the optical head device according to claim 10;

an optical information medium drive portion for driving the optical information medium; and a control portion for receiving a signal obtained from the optical head device, and based on the signal, for controlling the optical information medium drive portion and the laser light source and objective lens within the optical head device.

22. A computer, comprising:

the optical information apparatus according to claim 21;

an input device for inputting information;

a processing unit for processing based on information input from the input device and/or information read out by the optical information apparatus; and an output device for display or output of the information input by the input device, information read out by the optical information apparatus, or a result processed by the processing unit.

23. An optical disk player, comprising:

the optical information apparatus according to claim 21; and an information-to-image conversion apparatus for converting the information signal obtained from the optical information apparatus to an image.

24. A car navigation system, comprising the optical disk player according to claim 23.

25. An optical disk recorder, comprising:

the optical information apparatus according to claim 21; and an image-to-information conversion apparatus for converting image information to information for recording onto the optical information medium by the optical information apparatus.

26. An optical disk server, comprising:

the optical information apparatus according to claim 21; and a wireless input/output terminal for exchanging information between the optical information apparatus and an external portion.

27. An optical head device, comprising:

a first laser light source for emitting a first light beam of wavelength λ1;

a second laser light source for emitting a second light beam of wavelength λ2;

a third laser light source for emitting a third light beam of wavelength λ3;

a focusing optical system for focusing the first to third light beams emitted from the first to third laser light sources respectively, and forming minute spots respectively on first to third optical information media;

a photodetector for receiving a light beam to output an electric signal in accordance with light amount of the light beam; and a spherical aberration correction element for controlling spherical aberrations of the minute spots;

wherein spherical aberrations of the first and second light beams are controlled by the spherical aberration correction element;

wherein an optical path branching element for guiding the second light beam to an optical path that is different from that of the first light beam is provided between the spherical aberration correction element and the focusing optical system; and wherein a diffraction optical element for diffracting incident light beam to generate ±1$^{st}$-order diffracted light is provided, the diffraction optical element being disposed in the optical path along which the first light beam does not pass, and the second and third light beam pass.

28. The optical head device according to claim 27, wherein the first light beam is received by the photodetector, and an electric signal in accordance with the light amount of the first light beam is output, and wherein the second light beam is received by the photodetector, and an electric signal in accordance with the light amount of the second light beam is output.

29. The optical head device according to claim 27,
wherein a driving apparatus for driving the spherical aberration correction element is provided, and
wherein spherical aberrations of the first and second light beams are controlled by activating the driving apparatus.

30. The optical head device according to claim 27,
wherein the first light beam of wavelength $\lambda 1$ passes through the transparent substrate of substrate thickness t1 and is focused on the information recording surface of the first optical information recording medium by the focusing optical system, and
wherein the second light beam of wavelength $\lambda 2(>\lambda 1)$ passes through the transparent substrate of substrate thickness $t2(>\lambda 1)$ and is focused on the information recording surface of the second optical information recording medium by the focusing optical system.

31. An optical information apparatus, comprising:
the optical head device according to claim 27,
an optical information medium drive portion for driving the optical information medium; and
a control portion for receiving a signal obtained from the optical head device, and based on the signal, for controlling the optical information medium drive portion and the laser light source and focusing optical system within the optical head device.

32. A computer, comprising:
the optical information apparatus according to claim 31;
an input device for inputting information;
a processing unit for processing based on information input from the input device and/or information read out by the optical information apparatus; and
an output device for display or output of the information input by the input device, information read out by the optical information apparatus, or a result processed by the processing unit.

33. An optical disk player, comprising:
the optical information apparatus according to claim 31; and
an information-to-image conversion apparatus for converting the information signal obtained from the optical information apparatus to an image.

34. An optical disk recorder, comprising:
the optical information apparatus according to claim 31; and
an image-to-information conversion apparatus for converting image information to information for recording onto the optical information medium by the optical information apparatus.

35. An optical disk server, comprising:
the optical information apparatus according to claim 31; and
a wireless input/output terminal for exchanging information between the optical information apparatus and an external portion.

36. An optical head device, comprising:
a first laser light source for emitting a first light beam of wavelength $\lambda 1$;
a second laser light source for emitting a second light beam of wavelength $\lambda 2$;
a third laser light source for emitting a third light beam of wavelength $\lambda 3$;
a focusing optical system for focusing the first to third light beams emitted from the first to third laser light sources respectively, and forming minute spots respectively on first to third optical information media;
a photodetector for receiving a light beam to output an electric signal in accordance with light amount of the light beam; and
a spherical aberration correction element for controlling spherical aberrations of the minute spots; and
a bending mirror for reflecting and transmitting the first to third light beams emitted from the first to third laser light sources;
wherein spherical aberrations of the first and second light beams are controlled by the spherical aberration correction element;
wherein an optical path branching element for guiding the second light beam to an optical path that is different from that of the first light beam is provided between the spherical aberration correction element and the focusing optical system;
wherein the focusing optical system comprises an objective lens, the objective lens focusing the first to third light beams that are reflected by the bending mirror, and forming minute spots on information recording surfaces of first to third optical, information media; and
wherein the photodetector comprises a first photodetector for receiving a light beam that is reflected by an optical information medium to output an electric signal in accordance with light amount of the light beam, and a second photodetector for receiving a light beam that is transmitted through the bending mirror to output an electric signal in accordance with light amount of the light beam.

37. The optical head device according to claim 36,
wherein the first light beam is received by the photodetector, and an electric signal in accordance with the light amount of the first light beam is output, and
wherein the second light beam is received by the photodetector, and an electric signal in accordance with the light amount of the second light beam is output.

38. The optical head device according to claim 36,
wherein a driving apparatus for driving the spherical aberration correction element is provided, and
wherein spherical aberrations of the first and second light beams are controlled by activating the driving apparatus.

39. The optical head device according to claim 36,
wherein the first light beam of wavelength $\lambda 1$ passes through the transparent substrate of substrate thickness t1 and is focused on the information recording surface of the first optical information recording medium by the focusing optical system, and
wherein the second light beam of wavelength $\lambda 2(>\lambda 1)$ passes through the transparent substrate of substrate thickness $t2(>t1)$ and is focused on the information recording surface of the second optical information recording medium by the focusing optical system.

40. An optical information apparatus, comprising:
the optical head device according to claim 36,
an optical information medium drive portion for driving the optical information medium; and
a control portion for receiving a signal obtained from the optical head device, and based on the signal, for controlling the optical information medium drive portion and the laser light source and focusing optical system within the optical head device.

41. A computer, comprising:
the optical information apparatus according to claim 40;
an input device for inputting information;
a processing unit for processing based on information input from the input device and/or information read out by the optical information apparatus; and
an output device for display or output of the information input by the input device, information read out by the optical information apparatus, or a result processed by the processing unit.

42. An optical disk player, comprising:
the optical information apparatus according to claim 40; and
an information-to-image conversion apparatus for converting the information signal obtained from the optical information apparatus to an image.

43. An optical disk recorder, comprising:
the optical information apparatus according to claim 40; and
an image-to-information conversion apparatus for converting image information to information for recording onto the optical information medium by the optical information apparatus.

44. An optical disk server, comprising:
the optical information apparatus according to claim 40; and
a wireless input/output terminal for exchanging information between the optical information apparatus and an external portion.

* * * * *

UNITED STATES PATENT AND TRADEMARK OFFICE
CERTIFICATE OF CORRECTION

PATENT NO. : 7,760,612 B2  
APPLICATION NO. : 10/504373  
DATED : July 20, 2010  
INVENTOR(S) : Komma et al.

It is certified that error appears in the above-identified patent and that said Letters Patent is hereby corrected as shown below:

Column 20, line 53 (claim 1): "wavelength)$\lambda 2$" should be --wavelength $\lambda 2$--.

Signed and Sealed this
Eighteenth Day of January, 2011

David J. Kappos  
*Director of the United States Patent and Trademark Office*